US011157207B2

United States Patent
Oh

(10) Patent No.: US 11,157,207 B2
(45) Date of Patent: Oct. 26, 2021

(54) APPARATUS AND METHOD FOR ENGAGING PLURAL MEMORY SYSTEM WITH EACH OTHER TO STORE DATA

(71) Applicant: SK hynix Inc., Icheon-si (KR)

(72) Inventor: Ik-Sung Oh, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/527,670

(22) Filed: Jul. 31, 2019

(65) Prior Publication Data
US 2020/0042250 A1 Feb. 6, 2020

(30) Foreign Application Priority Data

Jul. 31, 2018 (KR) .................. 10-2018-0089399
Nov. 12, 2018 (KR) .................. 10-2018-0138089

(51) Int. Cl.
*G06F 3/06* (2006.01)
*G06F 12/10* (2016.01)
*G06F 12/02* (2006.01)

(52) U.S. Cl.
CPC ............ *G06F 3/0659* (2013.01); *G06F 3/067* (2013.01); *G06F 3/0611* (2013.01); *G06F 12/0253* (2013.01); *G06F 12/10* (2013.01); *G06F 2212/1024* (2013.01); *G06F 2212/657* (2013.01)

(58) Field of Classification Search
CPC ...... G06F 3/0659; G06F 3/0611; G06F 3/067; G06F 12/10; G06F 12/0253; G06F 2212/1024; G06F 2212/657
See application file for complete search history.

(56) References Cited

U.S. PATENT DOCUMENTS

| 5,897,661 | A  | * | 4/1999  | Baranovsky ......... G06F 3/0608 707/999.202 |
|-----------|----|---|---------|----------------------------------------------|
| 6,157,991 | A  |   | 12/2000 | Arnon |
| 6,832,303 | B2 |   | 12/2004 | Tanaka |
| 8,380,943 | B2 |   | 2/2013  | Shaeffer |
| 8,621,137 | B2 |   | 12/2013 | Olbrich et al. |
| 8,935,465 | B1 |   | 1/2015  | Shaharabany et al. |
| 9,086,957 | B2 |   | 7/2015  | Cordero et al. |
| 9,158,689 | B2 |   | 10/2015 | Solihin |
| 9,690,675 | B2 |   | 6/2017  | Madduri et al. |
| 9,842,024 | B1 |   | 12/2017 | David et al. |
| 9,921,908 | B2 |   | 3/2018  | Yum et al. |
| 10,055,343| B2 |   | 8/2018  | Mylly et al. |
| 10,782,895| B2 |   | 9/2020  | Hsieh et al. |

(Continued)

FOREIGN PATENT DOCUMENTS

| CN | 104881249 A     | 9/2015  |
|----|-----------------|---------|
| KR | 1020150030036 A | 3/2015  |
| KR | 1020160117118 A | 10/2016 |

*Primary Examiner* — Kalpit Parikh
(74) *Attorney, Agent, or Firm* — William Park & Associates Ltd.

(57) ABSTRACT

A data processing system includes a host configured to handle data in response to an input entered from an external device. The data processing system further includes a plurality of memory systems engaged with the host, wherein the plurality of memory systems are configured to store or output the data in response to a request generated by the host. A first memory system among the plurality of memory systems can store metadata for the plurality of memory systems.

18 Claims, 16 Drawing Sheets

(56) References Cited

U.S. PATENT DOCUMENTS

| | | |
|---|---|---|
| 2006/0053252 A1* | 3/2006 | Ghezzi ................. G06F 3/0626 |
| | | 711/115 |
| 2010/0100660 A1 | 4/2010 | Tamagawa |
| 2012/0303878 A1 | 11/2012 | Haas et al. |
| 2013/0301373 A1 | 11/2013 | Tam |
| 2014/0049548 A1 | 2/2014 | Rao et al. |
| 2014/0108705 A1 | 4/2014 | Gorobets |
| 2014/0215129 A1 | 7/2014 | Kuzmin et al. |
| 2014/0289378 A1 | 9/2014 | Pinto et al. |
| 2014/0380303 A1 | 12/2014 | Bello et al. |
| 2015/0019794 A1 | 1/2015 | Byun |
| 2015/0074178 A1 | 3/2015 | Hong et al. |
| 2015/0193339 A1 | 7/2015 | Kim et al. |
| 2015/0312337 A1 | 10/2015 | Keremane et al. |
| 2015/0326481 A1 | 11/2015 | Rector |
| 2015/0347039 A1 | 12/2015 | Truong et al. |
| 2015/0355845 A1 | 12/2015 | Lee et al. |
| 2015/0363131 A1 | 12/2015 | Sinclair |
| 2015/0378948 A1 | 12/2015 | Parikh et al. |
| 2016/0019137 A1 | 1/2016 | Ellis et al. |
| 2016/0292111 A1 | 10/2016 | Doo et al. |
| 2016/0378652 A1 | 12/2016 | Takeda et al. |
| 2017/0038984 A1* | 2/2017 | Manabe ................ G06F 3/0619 |
| 2017/0060448 A1 | 3/2017 | Schnarch et al. |
| 2017/0177225 A1 | 6/2017 | Mehta |
| 2017/0277448 A1 | 9/2017 | Khoueir et al. |
| 2018/0004440 A1 | 1/2018 | Byun |
| 2018/0081569 A1 | 3/2018 | Kan et al. |
| 2018/0341413 A1 | 11/2018 | Lai et al. |
| 2019/0087362 A1 | 3/2019 | Satish et al. |
| 2020/0028894 A1 | 1/2020 | Memon et al. |
| 2020/0034048 A1 | 1/2020 | Gupta et al. |

\* cited by examiner

APPARATUS AND METHOD FOR ENGAGING PLURAL MEMORY SYSTEM WITH EACH OTHER TO STORE DATA

CROSS-REFERENCE TO RELATED APPLICATIONS

This patent application claims priority under 35 U.S.C. § 119(a) to Korean Patent Applications No. 10-2018-0089399 and No. 10-2018-0138089, filed on Jul. 31, 2018, and Nov. 12, 2018, respectively, the entire disclosures of which are incorporated herein by reference.

TECHNICAL FIELD

Various embodiments of the present teachings relate to a memory system and a data processing system including the memory system, and more particularly, to an apparatus and a method for improving operational efficiency in a process of reading or writing data in the data processing system.

BACKGROUND

Recently, a paradigm for a computing environment has shifted to ubiquitous computing, which enables computer systems to be accessed anytime and everywhere. As a result, the use of portable electronic devices, such as mobile phones, digital cameras, notebook computers, and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a nonvolatile semiconductor memory device is advantageous in that it has excellent stability and durability because it has no mechanical driving part (e.g., a mechanical arm), and has high data access speed and low power consumption. In the context of a memory system having such advantages, an exemplary data storage device includes a USB (Universal Serial Bus) memory device, a memory card having various interfaces, a solid state drive (SSD), or the like.

A computing device supporting ubiquitous computing may evolve, according to user's needs, to store more data in response to an increasing amount of content shared or accessed through the ubiquitous computing. As a method for storing more data, increasing storage capacity in a single memory system may be limited, as well as operational efficiency of the single memory system having larger storage capacity may become lower.

BRIEF DESCRIPTION OF THE DRAWINGS

The description herein makes reference to the accompanying drawings wherein like reference numerals refer to like parts throughout the figures, and wherein.

DETAILED DESCRIPTION

Figure 1:
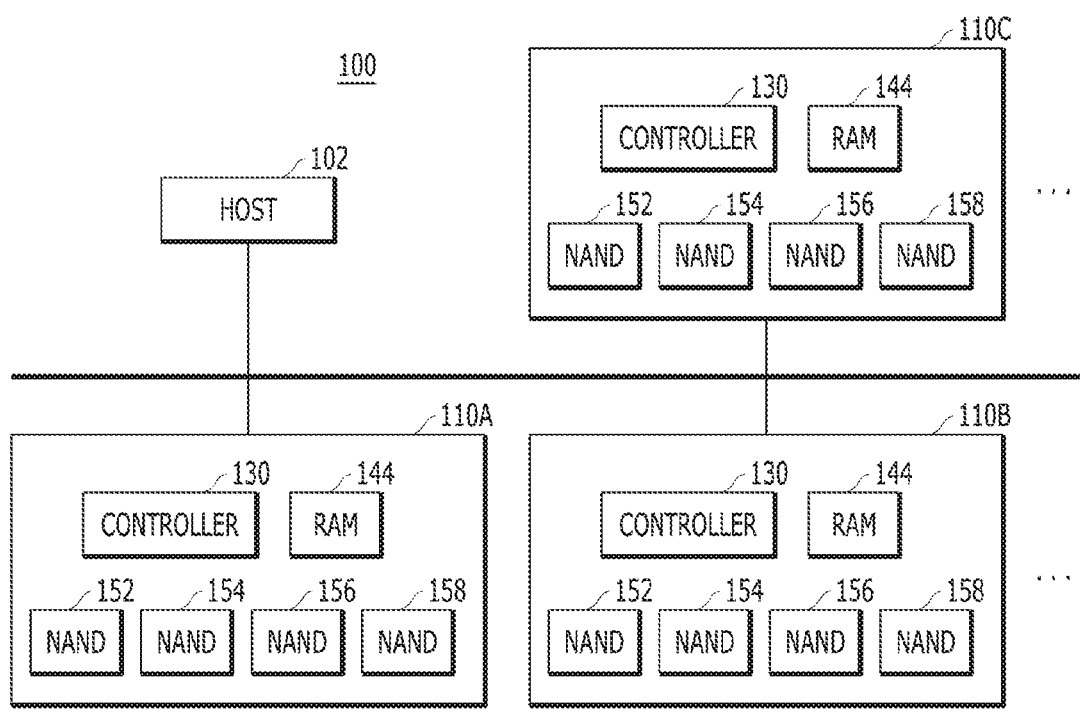
FIG. 1 illustrates a data processing system including a plurality of memory systems in accordance with an embodiment of the disclosure.

Various embodiments of the disclosure are described below in detail with reference to the accompanying drawings. Elements and features of the disclosure, however, may be configured or arranged differently to form other embodiments, which may be variations of any of the disclosed embodiments. Thus, the present teachings are not limited to the embodiments set forth herein. Rather, the described embodiments are provided so that this disclosure conveys the scope of the disclosure to those skilled in the art to which the present teachings pertain. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure can provide an apparatus and a method for configuring a data processing system including a plurality of memory systems through connection establishment or engagement of the plurality of memory systems. The embodiments can provide a link establishment method for coupling the plurality of memory systems, a method for assigning an identifier or an ID (identification) to each memory system for connection between a computing device and the plurality of memory systems.

Embodiments of the disclosure can provide a memory system, a data processing system, and an operation process or a method, which can quickly and reliably process data into a memory device by reducing operational complexity and performance degradation of the memory system, thereby enhancing usage efficiency of the memory device.

Embodiments of the disclosure also provide a data processing system including a plurality of memory systems or a data processing system in which at least one separate memory system can be added or attached either internally or externally. In the embodiments, a method and apparatus can give a priority to each memory system, and store metadata used for the plurality of memory systems in a memory system having the highest priority so that the data processing system can more efficiently determine which one of the plurality of memory systems is to be allocated or used to store data.

In the data processing system including the plurality of memory systems or the data processing system in which at least one separate memory system can be added or attached either internally or externally, when at least one memory system among the plurality of memory systems is either detached (not coupled or engaged) or performance (e.g., an operation status) of the at least one memory system falls below a threshold, embodiments of the disclosure can reset priorities given to each of the plurality of memory systems and transfer authority assigned to the memory system having the previous highest priority to another memory system having the current highest priority such that the data processing system can stably or efficiently handle voluminous data.

In an embodiment, a data processing system includes a host configured to handle data in response to an input entered from an external device. The data processing system also includes a plurality of memory systems engaged with the host, wherein the plurality of memory systems are configured to store or output the data in response to a request generated by the host. Herein, a first memory system among the plurality of memory systems can store metadata for the plurality of memory systems.

By the way of example but not limitation, a highest priority among priorities assigned to the first memory system is higher than that assigned to other memory systems among the plurality of memory systems is assigned to the first memory system. The first memory system can assign a different logical identifier to each other memory system of the plurality of memory systems. When an operational status of the first memory system meets a preset condition, the highest priority of the first memory system is migrated to one of the other memory systems.

For example, the first memory system is embedded in the host, and at least one of the other memory systems is detachable from the host. Even though at least one of the other memory systems is detached from the host, a logical identifier assigned to the at least one of the other memory systems and metadata stored in the first memory system are maintained. When at least one of the plurality of memory systems is unable to perform data communication with the host, a logical identifier assigned to the at least one memory system is withdrawn and re-assigned to another memory system.

The metadata can include first mapping information used for translating a logical address into a physical address. Each of the plurality of memory systems includes second mapping information used for translating a physical address into a logical address.

Each of the plurality of memory systems can perform garbage collection according to an autonomous decision. The first memory system can perform garbage collection against the metadata when the host performs re-configuration on the metadata.

The first memory system transfers the metadata into the host when power is supplied into the host and the first memory system. When the first memory system updates or modifies the metadata, the first memory system sends a request for transferring and updating the metadata to the host.

In another embodiment, a memory system includes a memory device including a first region configured to store metadata and a second region configured to store user data. The memory system also includes a controller configured to store or delete the metadata and the user data in the memory device. The controller is notified by a host of authority to use a part of a memory included in the host after being operatively engaged with the host. When a given priority of the memory system is a preset value, the controller determines a logical identifier for at least one other memory system, transmits the logical identifier to the host, and stores metadata for the at least one other memory system in the memory device. The controller requests the host to store at least one of the metadata or user data transferred from the host to the controller or the at least one other memory system in the part of the memory included in the host.

The metadata can include first mapping information used for translating a logical address into a physical address.

When the given priority of the memory system is not the preset value, the first mapping information is not stored in the memory device but transferred into another memory system having the given priority of the present value.

The memory device stores second mapping information used for translating a physical address into a logical address, regardless of the given priority of the memory system.

The controller uses the second mapping information to perform garbage collection without a command entered from the host.

In another embodiment, a system, engaged with a host and a plurality of memory systems, includes at least one processor and at least one memory including computer program code. The at least one memory and the computer program code are configured, with the at least one processor, to cause the system to: transmit metadata to a part of a host memory included in the host; receive a read command and a first logical address which are entered from the host; search for a first physical address, which corresponds to the first logical address entered with the read command from the host, in the at least one memory; send a request for some of the metadata associated with the first logical address when the first physical address is not found; receive the some of the metadata delivered in response to the request to store the some of the metadata in the at least one memory; translate the first logical address into the first physical address based on the some of the metadata; and use the first physical address to access a memory device and output data stored at a physical location in the memory device, which is identified by the first physical address.

The at least one memory and the computer program code are configured, with the at least one processor, to further cause the system to: receive a write command entered from the host; request the host to store data corresponding to the write command in the part of the host memory when the data is larger than a preset threshold; check that the data is copied in the part of the host memory, and notify it to the host that an operation corresponding to the write command is complete; and migrate the data copied in the part of the host memory to the memory device while no commend is entered from the host.

The at least one memory and the computer program code are configured, with the at least one processor, to further cause the system to assign a logical identifier corresponding to each of the plurality of other memory systems.

The at least one memory and the computer program code are configured, with the at least one processor, to further cause the system to copy the metadata to one of the plurality of other memory systems when an operational status meet a preset condition.

The memory device includes a first region storing the metadata and a second region storing user data. The metadata includes first mapping information used for translating a logical address into a physical address regarding the user data and data stored in the plurality of other memory systems.

Embodiments of the disclosure will now be described in detail with reference to the accompanying drawings, wherein like numbers reference like elements.

In FIG. 1, a data processing system 100 in accordance with an embodiment of the disclosure is described. The data processing system 100 can include a plurality of memory systems 110A, 110B, 110C. In response to a request entered from a host 102, the plurality of memory systems 110A, 110B, 110C can store data or output data stored therein.

Although FIG. 1 illustrates that the data processing system 100 includes at least three memory systems, the data processing system 100 may include more than one memory system engaged with each other, according to an embodiment. In an embodiment, at least one memory system included in the data processing system 100 can be detachable.

Each of the plurality of memory systems 110A, 110B, 110C may include a controller 130, a memory 144, and a plurality of memory devices 152, 154, 156, 158. According to an embodiment, the plurality of memory devices 152, 154, 156, 158 included in each of the plurality of memory systems 110A, 110B, 110C may be a kind of non-volatile memory devices capable of storing data even when power is turned off. Although it is described in FIG. 1 that each of the plurality of memory systems 110A, 110B, 110C includes four memory devices, a memory device according to an embodiment may include at least one memory device.

Although not shown, each of the memory devices 152, 154, 156, 158 may include at least one block, and each block may include a plurality of pages. Internal configuration and a specific operation in the memory devices 152, 154, 156, 158 is described later with reference to FIGS. 2 to 5.

The host 102 may include a computing device that a user may use. For example, the host 102 may include a desktop, a personal computer such as a laptop, a mobile device such as a cellular phone, or a server that may be used in an office, a school, a laboratory, and the like. As an amount of data to be stored or handled by the user increases, the number of memory systems 110A, 110B, 110C associated or engaged with the host 102 in the data processing system may increase.

The host 102 and the plurality of memory systems 110A, 110B, 110C can transmit and receive commands and data to each other at a high speed. To this end, the plurality of memory systems 110A, 110B, 110C and the host 102 may support a serial communication method. For example, the serial communication method may include at least one protocol for use in a Mobile Industry Processor Interface (MIPI) M-PHY (a high speed data communications physical layer standard developed by the MIPI Alliance), a Universal Asynchronous Receiver Transmitter (UART), a Serial Peripheral Interface Bus (SPI), and an Inter Integrated Circuit (I2C).

For example, when the plurality of memory systems 110A, 110B, 110C can support or meet the specifications of Universal Flash storage (UFS), embedded UFS (eUFS), the plurality of memory systems 110A, 110B, 110C and the host 102 may use a high-speed serial communication interface of a Mobile Industry Processor Interface (MIPI) M-PHY. Here, the M-PHY at the physical layer is a kind of embedded clock serial interface technology with very high bandwidth capability developed for higher performance and low power requirements of mobile applications. In addition, the plurality of memory systems 110A, 110B, 110C may support the UniPro standard technology at a link layer.

The host 102 engaged with the plurality of memory systems 110A, 110B, 110C can recognize the plurality of memory systems 110A, 110B, 110C, separately. For the recognition, the host 102 may assign an identifier or an ID to each of the plurality of memory systems 110A, 110B, 110C.

The plurality of memory systems 110A, 110B, 110C engaged with the host 102 may have a given priority, respectively. For example, the priority can be divided into primary and secondary. Depending on an embodiment, the priority may be set to more levels or stages which may be individually assigned to the plurality of memory systems 110A, 110B, 110C.

According to an embodiment, a first memory system (e.g., 110A), which is one of the plurality of memory systems 110A, 110B, 110C, may be given a higher priority than other memory systems (e.g., 110B, 110C). In this case, the first memory system 110A may store metadata for all of the plurality of memory systems 110A, 110B, 110C.

According to an embodiment, the metadata for all of the plurality of memory systems 110A, 110B, 110C stored in the first memory system 110A may include a first mapping information for identifying a physical address corresponding to a logical address. The first mapping information is used for translating the logical address used by the host 102 into the physical address which indicates a physical location in the plurality of memory systems 110A, 110B, 110C.

According to an embodiment, a first memory system among a plurality of memory systems 110A, 110B, 110C, which is given the highest priority, can be embedded in the host 102, but other memory systems among the plurality of memory systems 110A, 110B, 110C may be removable from the host 102.

On the other hand, according to an embodiment, the first memory system given the highest priority among the plurality of memory systems 110A, 110B, 110C might not be embedded in the host 102. However, in order to support the operation of the host 102 engaged with the plurality of memory systems 110A, 110B, 110C while power is supplied to the data processing system 100, the first memory system should be electrically connected to the host 102.

Hereinafter, exemplary operations in the data processing system 100 including the plurality of memory systems 110A, 110B, 110C and the host 102 engaged with the plurality of memory systems 110A, 110B, 110C is described with reference to FIG. 1. First, it is assumed that the first memory system 110A among the plurality of memory systems 110A, 110B, 110C has been given a primary priority and is built-in or embedded in the host 102.

When the host 102 detects other memory systems 110B, 110C among the plurality of memory systems 110A, 110B, 110C, the host 102 can inform operation information regarding the other memory systems 110B and 110C to the first memory system 110A.

The first memory system 110A may determine logical identifiers for each of the other memory systems 110B, 110C among unassigned identifiers, and notify the host 102 of the available logical identifiers which might be individually given to the other memory systems 110B, 110C. Based on this, the host 102 may assign the logical identifiers to the other memory systems 110B, 110C.

In another example, the host 102 can recognize and assign available identifiers without any support of the first memory system 110A and notify the first memory system 110A of the identifiers assigned to the other memory systems 110B, 110C.

Further, according to an embodiment, the first memory system 110A or the host 102 can determine and assign priorities to the other memory systems 110B, 110C. If the host 102 determines priorities for the other memory systems 110B, 110C, those priorities are communicated to the first memory system 110A so that the first memory system 110A can store operational information regarding the other memory systems 110B, 110C.

On the other hand, the other memory systems 110B, 110C can store the logical identifiers assigned to themselves. The other memory systems 110B, 110C can, using the stored logical identifiers, transmit and receive data whenever they are interworked with the host 102.

According to an embodiment where the data processing system 100 includes plural hosts 102, a plurality of memory systems 110A, 110B, 110C may store a plurality of logical identifiers. Each of the plurality of memory systems 110A, 110B, 110C may use a different logical identifier between plural assigned logical identifiers depending on which host 102 they are interworked with. For example, while the second memory system 110B is interworked with the host 102, a logical identifier 'AB' which is one of logical identifiers assigned to the second memory system 110B can be used. Further, when the second memory system 110B is interworked with another host (not shown), it is possible for the second memory system 110B to use another logical identifier 'ED'. Here, a logical identifier used by the plurality of memory systems 110A, 110B, 110C for communication with the host 102 is a kind of logical address, which is used to determine location of data in the data processing system. Depending on an embodiment, the logical identifiers used between the host 102 and the plurality of memory systems 110A, 110B, 110C may be set differently.

In order to physically recognize the plurality of memory systems 110A, 110B, 110C, the host 102 can recognize unique information possessed by each of the plurality of memory systems 110A, 110B, 110C. A Universal Unique Identifier (UUID) is an example that may be used between the host 102 and the plurality of memory systems 110A, 110B, 110C. The universal unique identifier (UUID) may include a number of 16 octets (128 bits). In a standard format, the universal unique identifier (UUID) is represented by 32 hexadecimal digits, separated by a hyphen (5 groups of 8-4-4-4-12) totaling 36 characters (32 characters and 4 hyphens). Here, the universal unique identifier (UUID) can be used together with a logical identifier set between the host 102 and the plurality of memory systems 110A, 110B, 110C for data communication between the host 102 and the plurality of memory systems 110A, 110B, and 110C. A header in a format of which is determined according to a predetermined communication protocol can include the universal unique identifier (UUID).

Identification information for data communication between the host 102 and the plurality of memory systems 110A, 110B, 110C may be stored in a specific area, e.g., Master Boot Record (MBR), of the first memory system 110A having the highest priority. When power is supplied to the host 102 and the plurality of memory systems 110A, 110B, 110C, data or firmware stored in a specific area of the first memory system 110A is executed first. Thus, basic information for data communication such as the identification information used between the host 102 and the plurality of memory systems 110A, 110B, 110C can be stored in the specific area.

The logical identifier set between the host 102 and the plurality of memory systems 110A, 110B, 110C can be used for data transmitted and received through a communication protocol supported by the host 102 and the plurality of memory systems 110A, 110B, 110C. The communication protocol used between the host 102 and the plurality of memory systems 110A, 110B, 110C may support at least one master and at least one slave. When the communication protocol supports one master, the host 102 may be a master while the plurality of memory systems 110A, 110B, 110C may be slaves. On the other hand, when the communication protocol supports a plurality of masters, the host 102 and the first memory system 110A having the highest priority assigned by the host 102 may be masters, and the other memory systems 110B, 110C may be slaves.

In a case when the host 102 recognizes another memory system 110B, 110C newly, the host 102 can notify the first memory system 110A of the newly recognized memory system. The first memory system 110A may receive the metadata stored in the newly recognized memory system 110B, 110C.

In a case when the first memory system 110A is a master, the first memory system 110A may directly request metadata to other memory systems 110B, 110C notified from the host 102. Other memory systems 110B, 110C working as a slave may transmit their metadata to the first memory system 110A in response to a request delivered from the first memory system 110A.

On the other hand, when the first memory system 110A works as a slave, the host 102 can receive the metadata of the other memory systems 110B, 110C and transfer the metadata to the first memory system 110A.

The first memory system 110A adds logical identifiers assigned to the other memory systems 110B, 110C to the metadata delivered from the host 102 or the other memory systems 110B, 110C so that metadata regarding all of the memory systems 110A, 110B, 110C engaged with the host 102 can be completely prepared.

According to an embodiment, the other memory systems 110B and 110C may maintain or delete their metadata which they have stored, after transmitting their metadata to the first memory system 110A. When the other memory systems 110B, 110C maintain metadata, they can be used as a backup of metadata controlled by the first memory system 110A. On the other hand, when the other memory systems 110B, 110C do not store or hold their metadata, the other memory systems 110B, 110C can receive their metadata controlled by the first memory system 110A or the host 102 before being separated from the host 102. In the above-described cases, the other memory systems 110B, 110C may maintain minimal metadata for use in other computing systems after detached from the host 102.

According to an embodiment, each of the memory systems 110A, 110B, 110C might individually perform garbage collection based on an autonomous decision. For example, the memory system 110B can perform garbage collection against data stored therein without any instruction or command entered from the host 102 or the first memory system 110A.

When metadata for the other memory systems 110B, 110C coupled to the host 102 is not recognized, the first memory system 110A newly generates metadata for the other memory systems 110B, 110C. For example, when the other memory systems 110B, 110C are in an empty state with no data, or if data stored in the other memory systems 110B, 110C is unusable or incompatible with the host 102, the first memory system 110A can generate metadata against the other memory system 110B, 110C. In some cases, the first memory system 110A may perform garbage collection to secure storage space for newly generated metadata.

On the other hand, the first memory system 110A may no longer be able to perform operations as a device designated with the highest priority. For example, the first memory system 110A may no longer have a room to generate and store new metadata, or the first memory system 110A may be worn out or run out. In this case, the first memory system 110A may migrate its status or its authority as a device having the highest priority to one of the other memory systems 110B, 110C. The highest priority can be given to the one of the other memory systems 110B, 110C.

When the logical identifiers are granted along with physical recognition of the plurality of memory systems 110A, 110B, 110C engaged with the host 102, the host 102 may perform a read, a write, or an erase operation to the memory systems 110A, 110B, 110C. As a master, the host 102 can broadcast commands, data, and the like to the plurality of memory systems 110A, 110B, 110C. Because the host 102 can be engaged with the plurality of memory systems 110A, 110B, 110C as one-to-many (N, where N is a natural number of 2 or more) scheme, the host 102 might not designate a specific memory system to transmit commands or data. It may be more efficient for the host 102 to broadcast commands or data to the plurality of memory systems 110A, 110B, 110C. The plurality of memory systems 110A, 110B, 110C can identify a packet including at least one of a logical identifier or a universal unique identifier, and selectively receive only a packet which corresponds to them.

The host 102 can load metadata for the plurality of memory systems 110A, 110B, 110C from the first memory system 110A in order to select one of the plurality of memory systems 110A, 110B, 110C for data transmission. For example, a specific area of the memory included in the host 102 may be designated to load and store the metadata for the plurality of memory systems 110A, 110B, 110C.

Depending on an embodiment, a method of utilizing a part of the memory included in the host 102 may be different. The method of utilizing a part of the memory included in the host 102 is described later with reference to FIGS. 6 to 11.

Meanwhile, when the host 102 in the data processing system 100 performs a read operation, a write operation or an erase operation on the plurality of memory systems 110A, 110B, 110C, the first memory system 110A might not work as a device having the highest priority as described above. In this case, before performing the read, write or erase operation requested by the host 102, the first memory system 110A can recognize another memory system 110B or 110C coupled with the first memory system 110A, and transfer the authority given to the highest priority device (e.g., a primary device) to the another memory system 110B or 110C. This operation may be referred to as (authority) migration. For example, when the first memory system 110A working as the primary device migrates its authority due to an expected loss of the first memory system 110A which is the primary device, the first memory system 110A can transfer data or information into the second memory system 110B which is a secondary device having a lower priority than the primary device. Then, the host 102 may then load metadata from the second memory system 110B which becomes the primary device.

Figure 2:
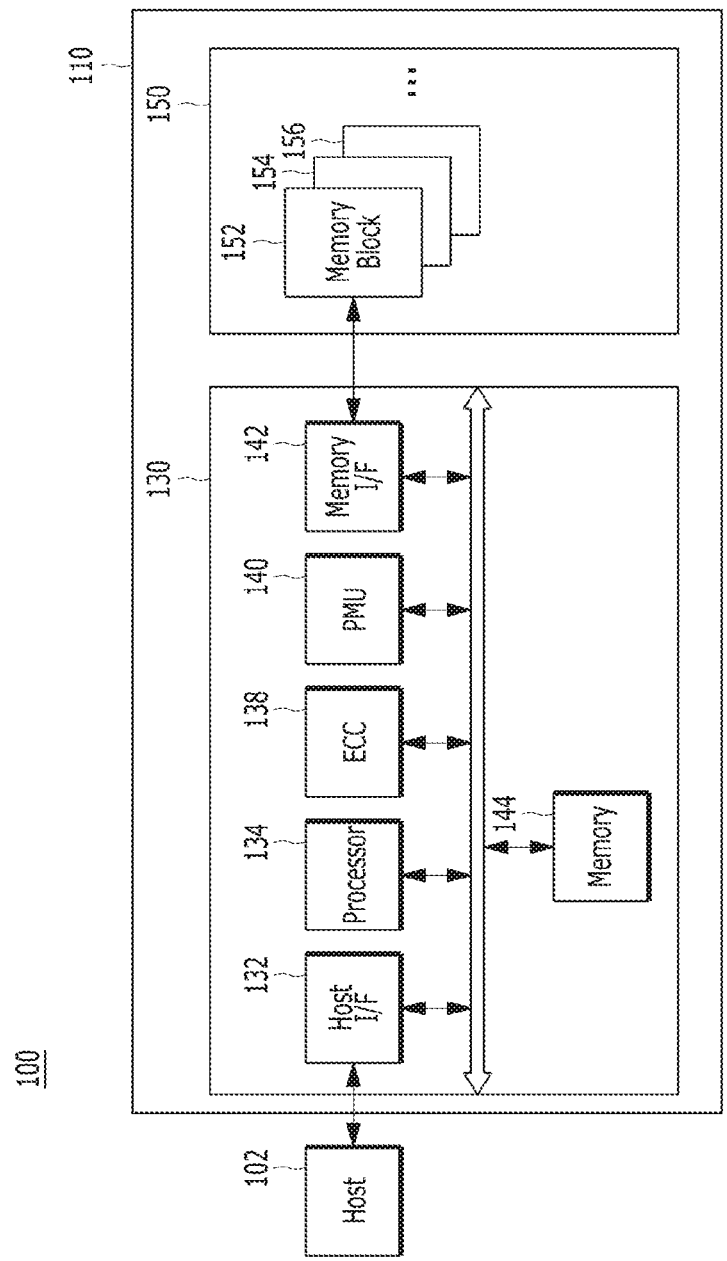
FIG. 2 shows a data processing system including a memory system in accordance with an embodiment of the disclosure.

In FIG. 2, a data processing system 100 in accordance with an embodiment of the disclosure is described. Referring to FIG. 2, the data processing system 100 may include a host 102 engaged or interlocked with a memory system 110. The memory system 110 shown in FIG. 2 may correspond to at least one of the plurality of memory systems 110A, 110B, 110C shown in FIG. 1.

The host 102 may include, for example, a portable electronic device such as a mobile phone, an MP3 player and a laptop computer, or an electronic device such as a desktop computer, a game player, a television (TV), a projector and the like.

The host 102 also includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to user's requests. By the way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described later, in reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By the way of example but not limitation, the controller 130 and the memory device 150 may be integrated into a single semiconductor device. The controller 130 and memory device 150 may be so integrated into an SSD for improving an operation speed. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, an error correction code (ECC) component 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through a firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 might not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include and all circuits, modules, systems or devices for performing the error correction operation based on at least one of the above described codes.

The PMU 140 may manage an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data occurred or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 2 exemplifies the second memory 144 disposed within the controller 130, the invention is not limited thereto. That is, the memory 144 may be located within or external to the controller 130. For instance, the memory 144 may be embodied by an external volatile memory having a memory interface transferring data and/or signals between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling and the like. Particularly, the FTL may load, generate, update, or store map data. Therefore, the controller 130 may map a logical address, which is entered from the host 102, with a physical address of the memory device 150 through the map data. The memory device 150 may look like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programmed page) due to a characteristic of a flash memory device. Further, the controller 130 may store map data of the new data into the FTL.

For example, when performing an operation requested from the host 102 in the memory device 150, the controller 130 uses the processor 134 implemented in a microprocessor or central processing unit (CPU) or the like. The processor 134 engaged with the memory device 150 can handle instructions or commands corresponding to an inputted command from the host 102. The controller 130 can perform a foreground operation as a command operation, corresponding to an command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes an operation of copying and storing data stored in a memory block among the memory blocks 152, 154, 156 in the memory device 150 to another memory block, e.g., a garbage collection (GC) operation. The background operation can include an operation of moving or swapping data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 can determine which channel(s) or way(s) among a plurality of channels (or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By the way of example but not limitation, the controller 130 can recognize statuses regarding a plurality of channels (or ways) associated with a plurality of memory dies included in the memory device 150. The controller 130 may determine the state of each channel or each way as one of a busy state, a ready state, an active state, an idle state, a normal state and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a predetermined format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
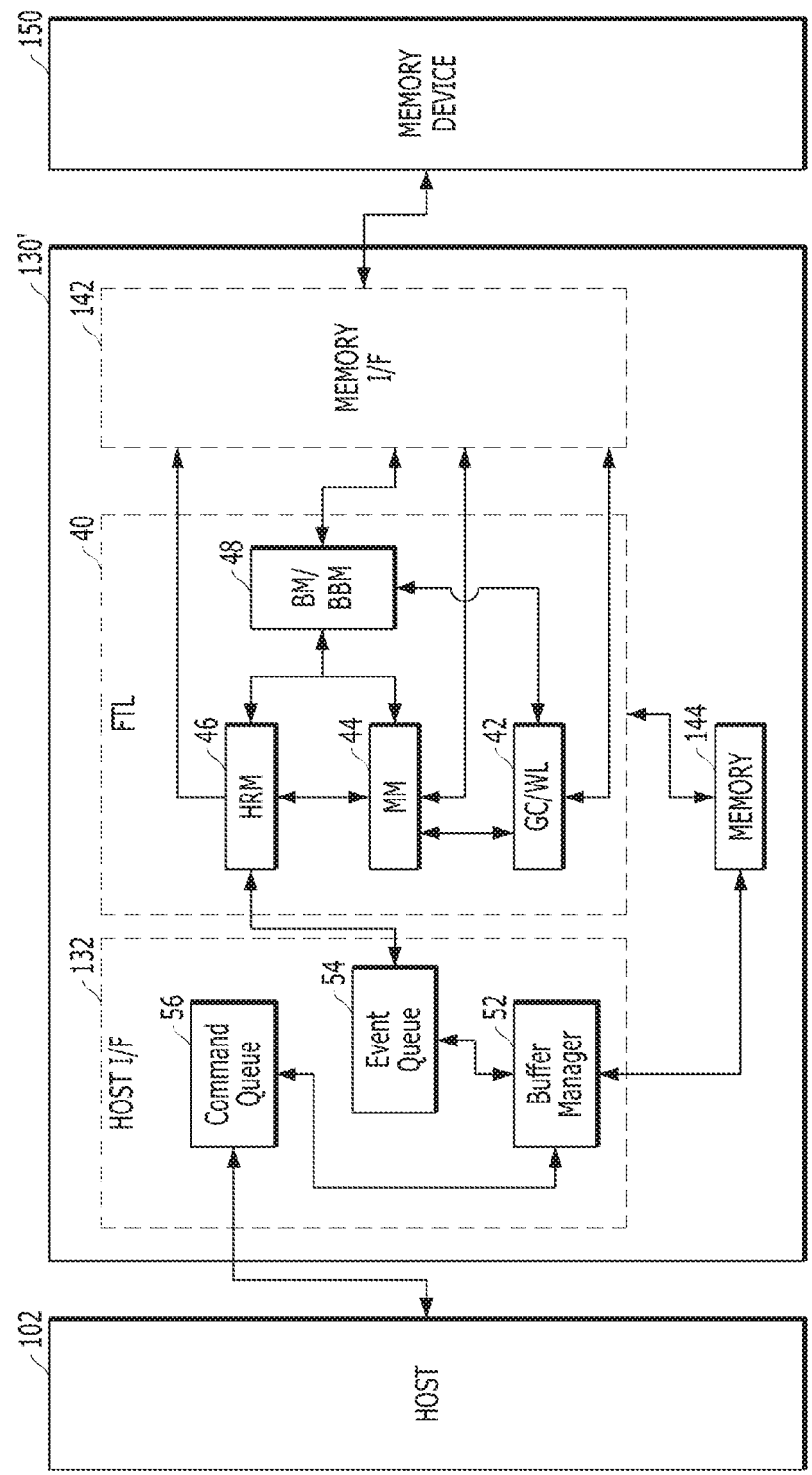
FIG. 3 illustrates a memory system in accordance with an embodiment of the disclosure.

Referring to FIG. 3, a controller in a memory system in accordance with another embodiment of the disclosure is described in detail. The memory system shown in FIG. 3 may correspond to at least one of the plurality of memory systems 110A, 110B, 110C shown in FIG. 1. The controller 130' cooperates with the host 102 and the memory device 150. As illustrated, the controller 130' includes a host interface 132, a flash translation layer (FTL) 40, as well as the host interface 132, the memory interface 142 and the memory 144 previously identified in connection with FIG. 2.

Although not shown in FIG. 3, in accordance with an embodiment, the ECC unit 138 described in FIG. 2 may be included in the flash translation layer (FTL) 40. In another embodiment, the ECC unit 138 may be implemented as a separate module, a circuit, firmware or the like, which is included in, or associated with, the controller 130'.

The host interface 132 is for handling commands, data, and the like transmitted from the host 102. By way of example but not limitation, the host interface 132 may include a command queue 56, a buffer manager 52 and an event queue 54. The command queue 56 may sequentially store commands, data, and the like received from the host 102 and output them to the buffer manager 52 in an order in which they are stored. The buffer manager 52 may classify, manage or adjust the commands, the data, and the like, which are received from the command queue 56. The event queue 54 may sequentially transmit events for processing the commands, the data, and the like received from the buffer manager 52.

A plurality of commands or data of the same characteristic, e.g., read or write commands, may be transmitted from the host 102, or commands and data of different characteristics may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130' will perform according to the characteristics of commands, data, and the like, which have been entered from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) 40. The event queue 54 receives events, entered from the buffer manager 52, which are to be internally executed and processed by the memory system 110 or the controller 130' in response to the commands, the data, and the like transmitted from the host 102, so as to deliver the events into the flash translation layer (FTL) 40 in the order received.

In accordance with an embodiment, the host interface 132 described in FIG. 3 may perform some functions of the controller 130' described in FIGS. 1 and 2. The host interface 132 may set the first memory 104 in the host 102 as a slave and add the first memory 104 as an additional storage space which is controllable or usable by the controller 130'.

In accordance with an embodiment, the flash translation layer (FTL) 40 can include a host request manager (HRM) 46, a map manager (MM) 44, a state manager 42 and a block manager 48. The host request manager (HRM) 46 can manage the events entered from the event queue 54. The map manager (MM) 44 can handle or control a map data. The state manager 42 can perform garbage collection or wear leveling. The block manager 48 can execute commands or instructions onto a block in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map data manager (MM) 44, to determine a physical address corresponding to the logical address which is entered with the events. The host request manager (HRM) 46 can send a read request with the physical address to the memory interface 142, to process the read request (handle the events). On the other hand, the host request manager (HRM) 46 can send a program request (write request) to the block manager 48, to program data to a specific empty page (no data) in the memory device 150, and then, can transmit a map update request corresponding to the program request to the map manager (MM) 44, to update an item relevant to the programmed data in information of mapping the logical-physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 might not perform the mapping table update. It is because the map request is issued with old physical information if the status manger 42 requests a map update and a valid page copy is completed later. The map manager 44 may perform a map update operation to ensure accuracy only if the latest map table still points to the old physical address.

In accordance with an embodiment, at least one of the state manager 42, the map manager 44 or the block manager 48 can include at least one circuitry for performing its own operation. As used in the disclosure, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

The memory device 150 can include a plurality of memory blocks. The plurality of memory blocks can be any of different types of memory blocks such as a single-level cell (SLC) memory block, a multi-level cell (MLC) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in a view of storage capacity. In an embodiment, the memory device 150 may be implemented with MLC memory blocks such as an MLC memory block, a triple-level cell (TLC) memory block, a quadruple-level cell (QLC) memory block and a combination thereof. The MLC memory block may include a plurality of pages implemented by memory cells, each capable of storing 2-bit data. The triple-level cell (TLC) memory block can include a plurality of pages implemented by memory cells, each capable of storing 3-bit data. The quadruple-level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory, a NOR flash memory and the like. Alternatively, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 4:
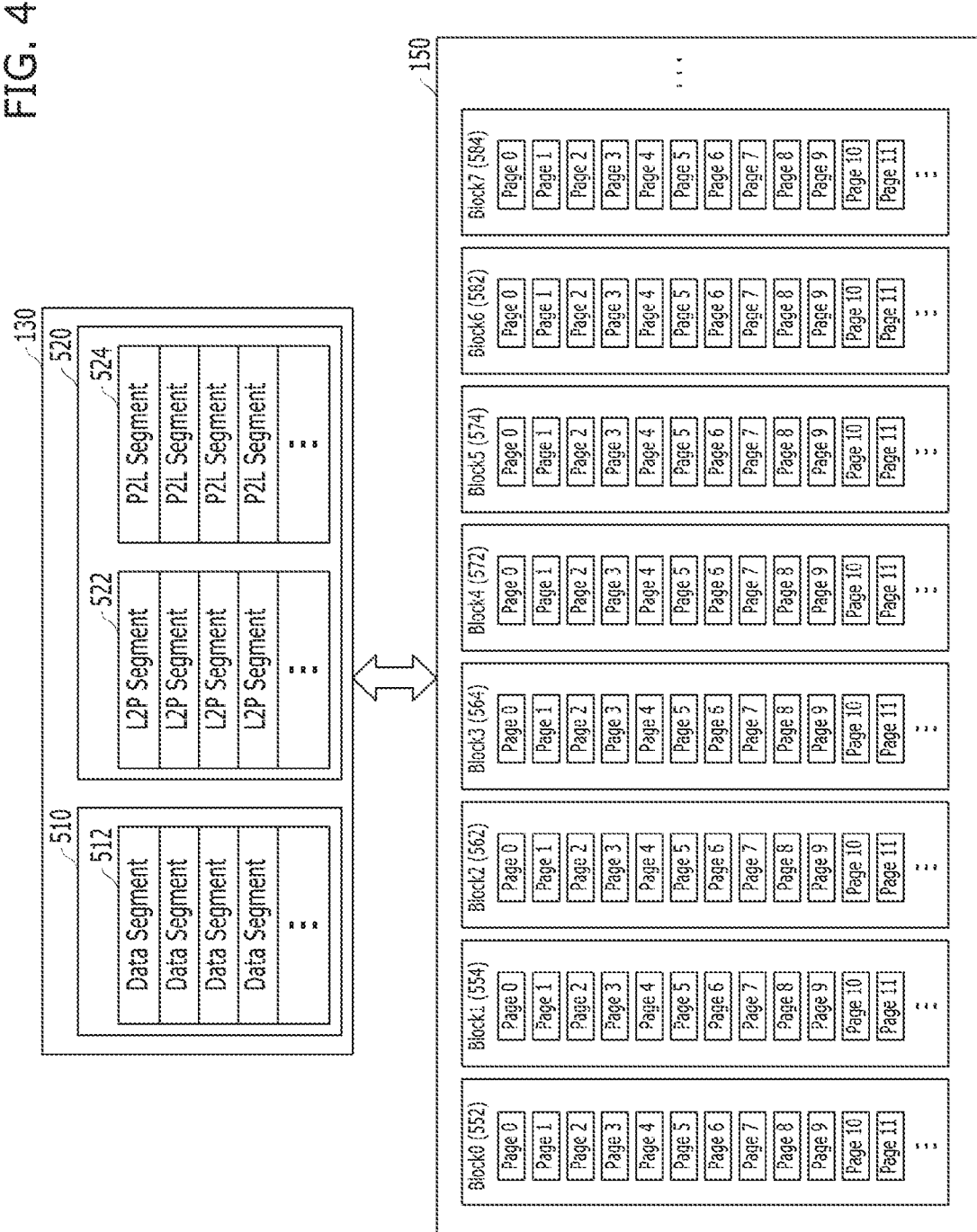
FIGS. 4 and 5 show a memory system which performs a plurality of command operations corresponding to a plurality of commands, in accordance with an embodiment of the disclosure.
Figure 5:
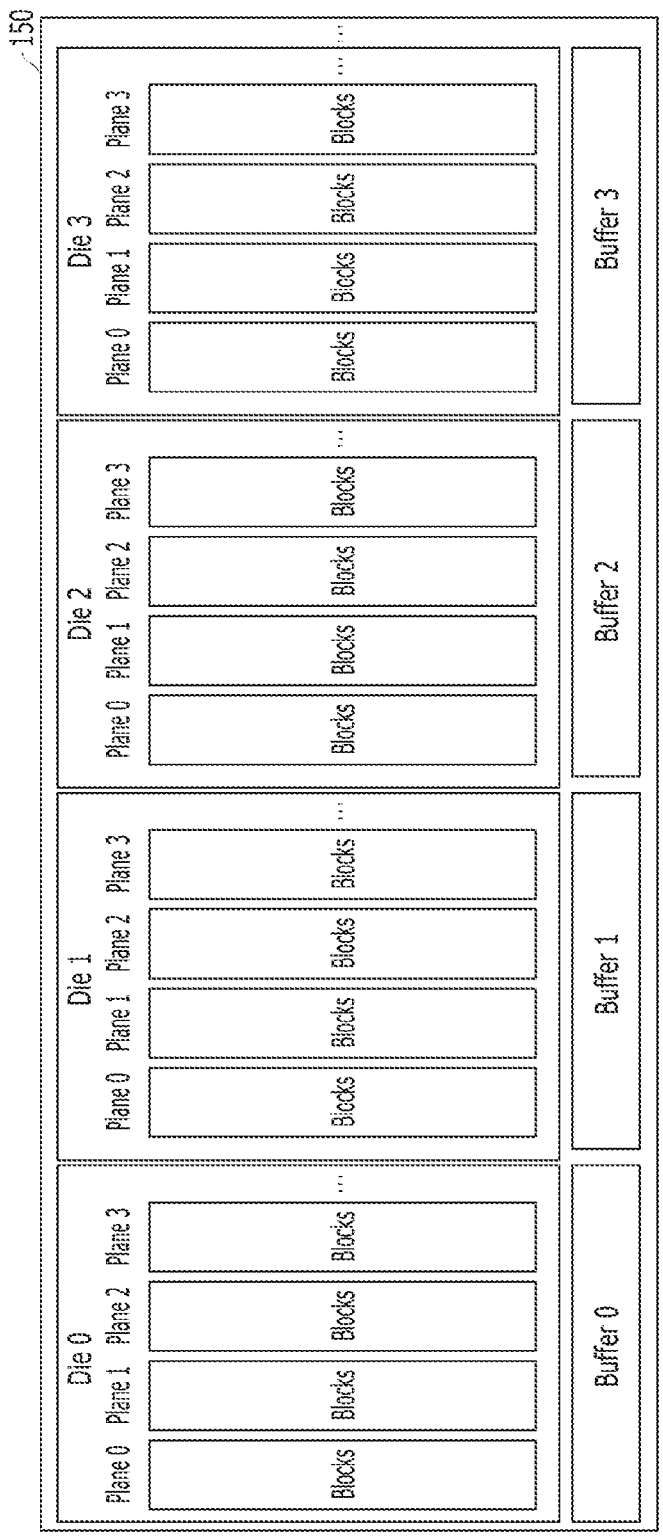

FIGS. 4 and 5 schematically illustrate performing a plurality of command operations corresponding to a plurality of commands in the memory system in accordance with an embodiment of the disclosure. For example, a plurality of write commands are received from the host 102, and program operations corresponding to the write commands are performed. In another example, a plurality of read commands are received from the host 102, and read operations corresponding to the read commands are performed. In still another example, a plurality of erase commands are received from the host 102, and erase operations corresponding to the erase commands are performed. In yet another example, a plurality of write commands and a plurality of read commands are received together from the host 102, and program operations and read operations corresponding to the write commands and the read commands, respectively, are performed.

In one embodiment, write data corresponding to a plurality of write commands entered from the host 102 are stored in the buffer/cache in the memory 144 of the controller 130, the write data stored in the buffer/cache are programmed to and stored in the plurality of memory blocks in the memory device 150, map data are updated in correspondence to the stored write data in the plurality of memory blocks, and the updated map data are stored in the plurality of memory blocks. In another embodiment, a plurality of write commands entered from the host 102 are performed. In another embodiment, a plurality of read commands are entered from the host 102 for the data stored in the memory device 150, data corresponding to the read commands are read from the memory device 150 by checking the map data of the data corresponding to the read commands, the read data are stored in the buffer/cache in the memory 144 of the controller 130, and the data stored in the buffer/cache are provided to the host 102. In other words, read operations corresponding to a plurality of read commands entered from the host 102 are performed. In addition, a plurality of erase commands are received from the host 102 for the memory blocks included in the memory device 150, memory blocks are checked corresponding to the erase commands, the data stored in the checked memory blocks are erased, map data are updated corresponding to the erased data, and the updated map data are stored in the plurality of memory blocks in the memory device 150. Namely, erase operations corresponding to a plurality of erase commands received from the host 102 are performed.

Further, while it is described below that the controller 130 performs command operations in the memory system 110, it is to be noted that, as described above, the processor 134 in the controller 130 may perform command operations in the memory system 110, through, for example, an FTL (flash translation layer). Also, the controller 130 programs and stores user data and metadata corresponding to write commands entered from the host 102, in select memory blocks, among the plurality of memory blocks in the memory device 150, reads user data and metadata corresponding to read commands received from the host 102, from select memory blocks, and provides the read data to the host 102, or erases user data and metadata, corresponding to erase commands entered from the host 102, from select memory blocks among the plurality of memory blocks in the memory device 150.

Metadata may include first map data including logical/physical (L2P: logical to physical) information (logical information) and second map data including physical/logical (P2L: physical to logical) information (physical information), for data stored in memory blocks corresponding to a program operation. Also, the metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all information and data excluding user data corresponding to a command received from the host 102.

That is, when the controller 130 receives a plurality of write commands from the host 102, program operations corresponding to the write commands are performed, and user data corresponding to the write commands are written and stored in empty memory blocks, open memory blocks or free memory blocks for which an erase operation has been performed, among the memory blocks of the memory device 150. Also, first map data, including an L2P map table or an L2P map list in which logical information as the mapping information between logical addresses and physical addresses for the user data stored in the memory blocks are recorded, and second map data, including a P2L map table or a P2L map list in which physical information as the mapping information between physical addresses and logical addresses for the memory blocks stored with the user data are recorded, are written and stored in empty memory blocks, open memory blocks or free memory blocks among the memory blocks of the memory device 150.

Here, in the case where write commands are entered from the host 102, the controller 130 writes and stores user data corresponding to the write commands in memory blocks. The controller 130 stores, in other memory blocks, metadata including first map data and second map data for the stored user data. Particularly, corresponding to the data segments of the stored user data, the controller 130 generates and updates the L2P segments of first map data, and the P2L segments of second map data as the map segments of map data among the meta segments of metadata. The controller 130 stores the map segments in the memory blocks of the memory device 150. The map segments stored in the memory blocks of the memory device 150 are loaded in the memory 144 included in the controller 130 and are then updated.

Further, in the case where a plurality of read commands are received from the host 102, the controller 130 reads data corresponding to the read commands, from the memory device 150, stores the read data in the buffers/caches included in the memory 144 of the controller 130. The controller 130 provides the data stored in the buffers/caches, to the host 102, by which read operations corresponding to the plurality of read commands are performed.

In addition, in the case where a plurality of erase commands is received from the host 102, the controller 130 checks memory blocks of the memory device 150 corresponding to the erase commands, and then, performs erase operations for the memory blocks.

When command operations corresponding to the plurality of commands received from the host 102 are performed while a background operation is performed, the controller 130 loads and stores data corresponding to the background operation, that is, metadata and user data, in the buffer/cache included in the memory 144 of the controller 130, and then stores the data, that is, the metadata and the user data, in the memory device 150. Herein, by way of example but not limitation, the background operation may include a garbage collection operation or a read reclaim operation as a copy operation, a wear leveling operation as a swap operation or a map flush operation, For instance, for the background operation, the controller 130 may check metadata and user data corresponding to the background operation, in the memory blocks of the memory device 150, load and store the metadata and user data stored in certain memory blocks in the buffer/cache in the memory 144 of the controller 130, and then store the metadata and user data in other memory blocks.

In the memory system in accordance with an embodiment of the disclosure, in the case of performing command operations as foreground operations, and a copy operation, a swap operation and a map flush operation as background operations, the controller 130 schedules queues corresponding to the foreground operations and the background operations, and allocates the scheduled queues to the memory 144 included in the controller 130 and the memory included in the host 102. In this regard, the controller 130 assigns identifiers (IDs) by respective operations for the foreground operations and the background operations to be performed in the memory device 150, and schedules queues corresponding to the operations assigned with the identifiers, respectively. In the memory system in accordance with an embodiment of the disclosure, identifiers are assigned not only by respective operations for the memory device 150 but also by functions for the memory device 150, and queues corresponding to the functions assigned with respective identifiers are scheduled.

In the memory system in accordance with an embodiment of the disclosure, the controller 130 manages the queues scheduled by the identifiers of respective functions and operations to be performed in the memory device 150. The controller 130 manages the queues scheduled by the identifiers of a foreground operation and a background operation to be performed in the memory device 150. In the memory system in accordance with an embodiment of the disclosure, after memory regions corresponding to the queues scheduled by identifiers are allocated to the memory 144 included in the controller 130 and the memory included in the host 102, the controller 130 manages addresses for the allocated memory regions. The controller 130 performs not only the foreground operation and the background operation but also respective functions and operations in the memory device 150, by using the scheduled queues.

Referring to FIG. 4, the controller 130 performs command operations corresponding to a plurality of commands received from the host 102, for example, program operations corresponding to a plurality of write commands entered from the host 102. The controller 130 programs and stores user data corresponding to the write commands in memory blocks of the memory device 150. Also, corresponding to the program operations with respect to the memory blocks, the controller 130 generates and updates metadata for the user data and stores the metadata in the memory blocks of the memory device 150.

The controller 130 generates and updates first map data and second map data which include information indicating that the user data are stored in pages included in the memory blocks of the memory device 150. That is, the controller 130 generates and updates L2P segments as the logical segments of the first map data and P2L segments as the physical segments of the second map data, and then stores the logical and physical segments in pages included in the memory blocks of the memory device 150.

For example, the controller 130 caches and buffers the user data corresponding to the write commands, received from the host 102, in a first buffer 510 included in the memory 144 of the controller 130. Particularly, after storing data segments 512 of the user data in the first buffer 510 used as a data buffer/cache, the controller 130 stores the data segments 512 in the first buffer 510 in pages in the memory blocks of the memory device 150. As the data segments 512 of the user data corresponding to the write commands received from the host 102 are programmed to and stored in the pages in the memory blocks, the controller 130 generates and updates the first map data and the second map data. The controller 130 stores the first and second map data in a second buffer 520 in the memory 144 of the controller 130. Particularly, the controller 130 stores L2P segments 522 of the first map data and P2L segments 524 of the second map data for the user data in the second buffer 520 as a map buffer/cache. As described above, the L2P segments 522 of the first map data and the P2L segments 524 of the second map data may be stored in the second buffer 520 of the memory 144 in the controller 130. A map list for the L2P segments 522 of the first map data and another map list for the P2L segments 524 of the second map data may be stored in the second buffer 520. The controller 130 stores the L2P segments 522 of the first map data and the P2L segments 524 of the second map data, which are stored in the second buffer 520, in pages included in the memory blocks of the memory device 150.

Moreover, the controller 130 performs command operations corresponding to a plurality of commands received from the host 102, for example, read operations corresponding to a plurality of read commands received from the host 102. Particularly, the controller 130 loads L2P segments 522 of first map data and P2L segments 524 of second map data as the map segments of user data corresponding to the read commands, in the second buffer 520, and checks the L2P segments 522 and the P2L segments 524. Then, the controller 130 reads the user data stored in pages of corresponding memory blocks among the memory blocks of the memory device 150, stores data segments 512 of the read user data in the first buffer 510, and then provides the data segments 512 to the host 102.

Furthermore, the controller 130 performs command operations corresponding to a plurality of commands entered from the host 102, for example, erase operations corresponding to a plurality of erase commands entered from the host 102. In particular, the controller 130 identifies memory blocks corresponding to the erase commands among the memory blocks of the memory device 150 to carry out the erase operations for the identified memory blocks.

In the case of performing an operation of copying data or swapping data among the memory blocks in the memory device 150, for example, a garbage collection operation, a read reclaim operation or a wear leveling operation, as a background operation, the controller 130 stores data segments 512 of corresponding user data, in the first buffer 510, loads map segments 522, 524 of map data corresponding to the user data in the second buffer 520, and then performs the garbage collection operation, the read reclaim operation or the wear leveling operation. In the case of performing a map update operation and a map flush operation for metadata, e.g., map data, for the memory blocks of the memory device 150 as a background operation, the controller 130 loads the corresponding map segments 522, 524 in the second buffer 520, and then performs the map update operation and the map flush operation.

As aforementioned, in the case of performing functions and operations including a foreground operation and a background operation for the memory device 150, the controller 130 assigns identifiers by the functions and operations to be performed for the memory device 150. The controller 130 schedules queues respectively corresponding to the functions and operations assigned with the identifiers, respectively. The controller 130 allocates memory regions, corresponding to the respective queues, to the memory 144 in the controller 130 and the memory in the host 102. The controller 130 manages the identifiers assigned to the respective functions and operations, the queues scheduled for the respective identifiers and the memory regions allocated to the memory 144 of the controller 130 and the memory of the host 102 corresponding to the queues, respectively. The controller 130 performs the functions and operations for the memory device 150, through the memory regions allocated to the memory 144 of the controller 130 and the memory of the host 102.

Referring to FIG. 5, the memory device 150 includes a plurality of memory dies, for example, a memory die 0, a memory die 1, a memory die 2 and a memory die 3, and each of the memory dies includes a plurality of planes, for example, a plane 0, a plane 1, a plane 2 and a plane 3. The respective planes in the memory dies in the memory device 150 include a plurality of memory blocks, for example, N blocks: Block0, Block1, . . . , BlockN−1, each including a plurality of pages, for example, 2M number of pages, as described above with reference to FIG. 3. Moreover, the memory device 150 includes a plurality of buffers corresponding to the respective memory dies, for example, a buffer 0 corresponding to the memory die 0, a buffer 1 corresponding to the memory die 1, a buffer 2 corresponding to the memory die 2 and a buffer 3 corresponding to the memory die 3.

In the case of performing command operations corresponding to a plurality of commands received from the host 102, data corresponding to the command operations are stored in the buffers included in the memory device 150. For example, in the case of performing program operations, data corresponding to the program operations are stored in the buffers, and are then stored in the pages included in the memory blocks of the memory dies. In the case of performing read operations, data corresponding to the read operations are read from the pages in the memory blocks of the memory dies, are stored in the buffers, and are then provided to the host 102 through the controller 130.

In an embodiment of the disclosure, the buffers in the memory device 150 are disposed externally to their respective memory dies. In another embodiment, the buffers may be disposed within their respective memory dies. Moreover, the buffers may correspond to their respective planes or their respective memory blocks in their respective memory dies. Further, in an embodiment of the disclosure, the buffers in the memory device 150 are the plurality of page buffers 322, 324 and 326 in the memory device 150 as described above with reference to FIG. 3. In another embodiment, the buffers may be a plurality of caches or a plurality of registers included in the memory device 150.

Also, the plurality of memory blocks included in the memory device 150 may be grouped into a plurality of super memory blocks, and command operations may be performed in the plurality of super memory blocks. Each of the super memory blocks may include a group of the plurality of memory blocks, for example, memory blocks in a first memory block group may form a first super memory block, and memory blocks in a second memory block group may form a second super memory block. In this regard, in the case where the first memory block group is included in the first plane of a first memory die, the second memory block group may be included in the first plane of the first memory die, be included in the second plane of the first memory die or be included in the planes of a second memory die.

In an embodiment of the present disclosure, a data processing system may include plurality of memory systems. Each of the plurality of memory systems 110 can include the controller 130 and the memory device 150. In the data processing system, one of the plurality of memory systems 110 can be a master and each of the others can be a slave. For example, the master may be determined based on contention (e.g., arbitration and conflict avoidance, or competition for resources) between the plural memory systems 110. When a plurality of commands is delivered from the host 102 in the data processing system, the master can determine a destination of each command based at least on statuses of channels or buses. For example, a first memory system can be determined as a master memory system among a plurality of memory systems, corresponding to information (e.g., operational status) delivered from the plurality of memory systems. If the first memory system is determined as the master memory system, the remaining memory systems are considered slave memory systems. A controller of the master memory system can check statuses of a plurality of channels (or ways, buses) coupled to a plurality of memory systems to select which memory system handles commands or data delivered from the host 102. In an embodiment, a master can be dynamically determined among the plural memory systems. In another embodiment, the master memory system, among the plurality of memory systems, may be changed periodically or according to an event. That is, the current master memory system may later become a slave memory system, and one of the slave memory systems may become the master memory system.

Hereinafter, a method and apparatus for transferring data in the memory system 110 including the memory system 150 and the controller 130 described above is described in more detail. As the amount of data stored in the memory system 110 becomes larger, the memory system 110 may be required to read or store large amounts of data at a time. However, a read time for reading a data stored in the memory device 150 or a program/write time for writing a data in the memory device 150 may be generally longer than a handling time for the controller 130 to process data or a data transmission time between the controller 130 and the memory system 150. For example, the read time might be twice that of the handling time. Because the read time or the program time is significantly longer than the handling time or the data transmission time, a procedure or a process for delivering data in the memory system 110 may affect performance of the memory system 110, e.g., operation speed, and/or structure of the memory system 110 such as a buffer size.

Figure 6:
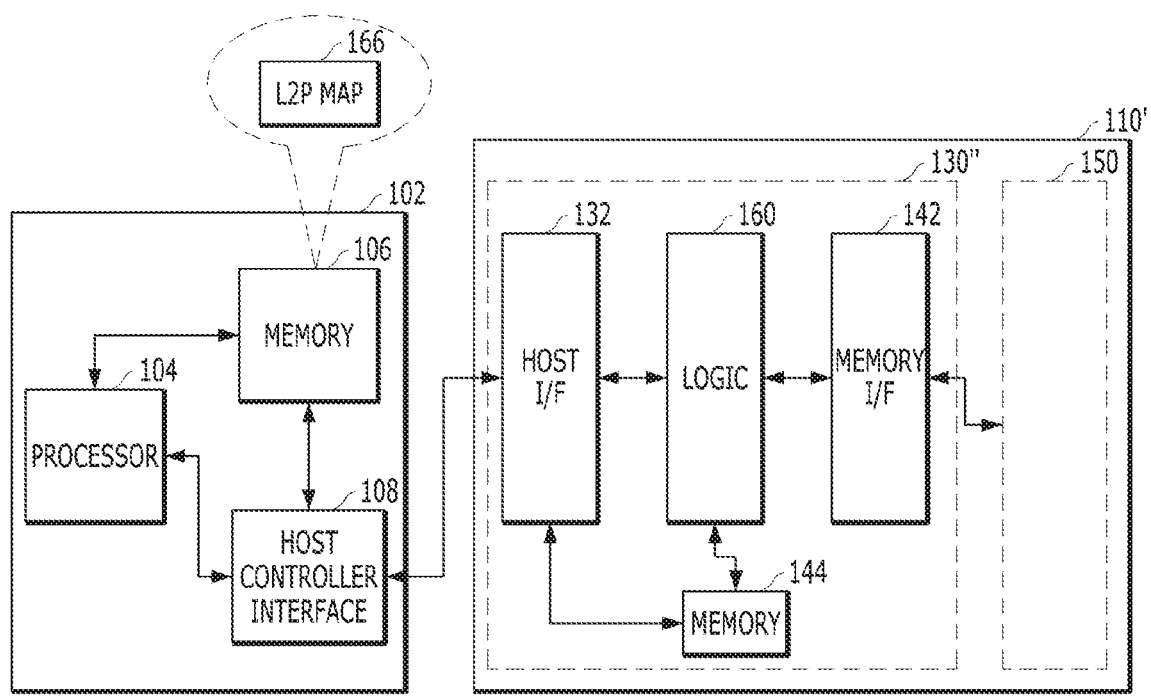
FIGS. 6 to 11 illustrates examples of enhancing or increasing operational efficiency in a memory system and a data processing system.
Figure 7:
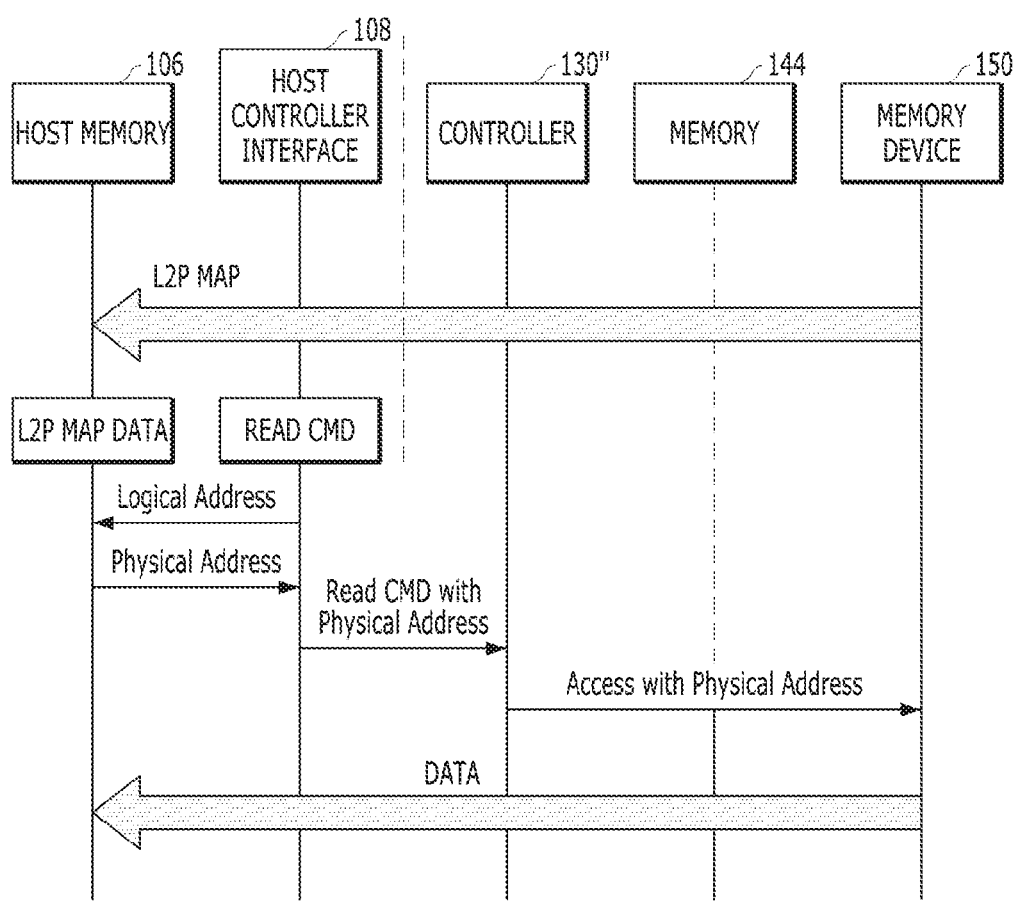
Figure 8:
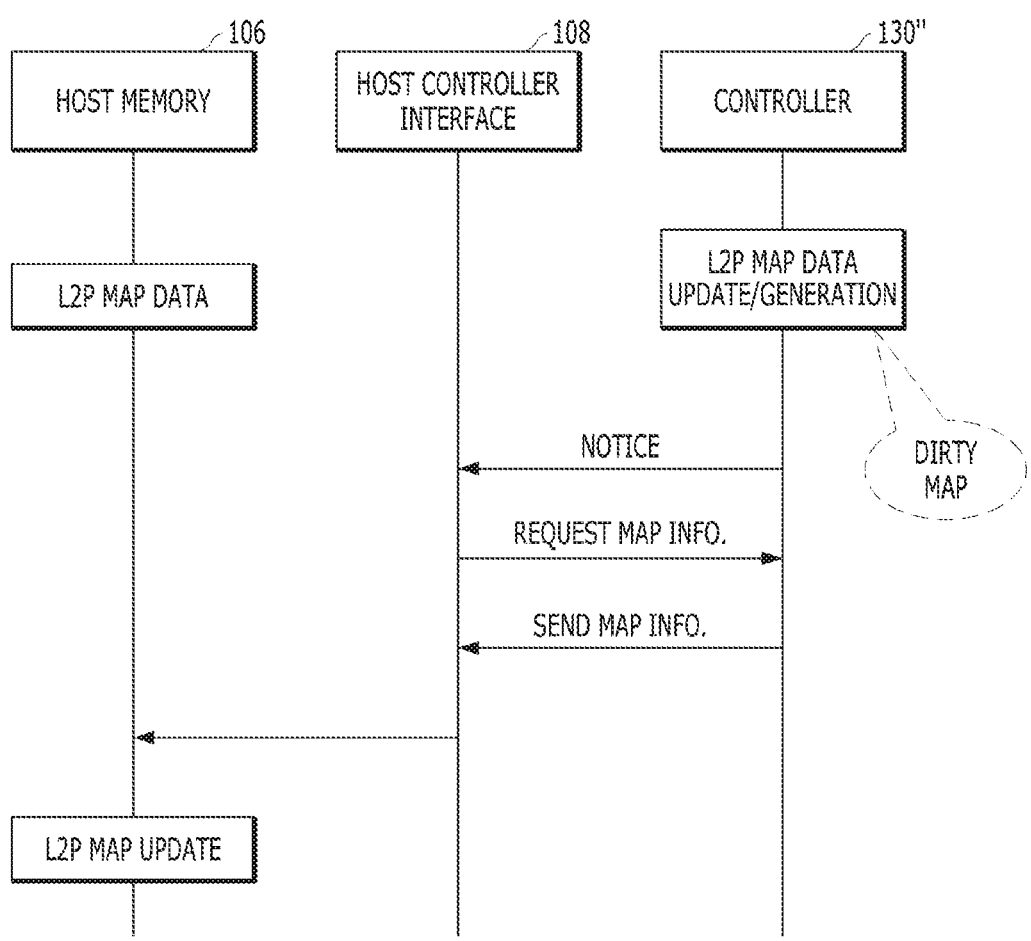
Figure 9:
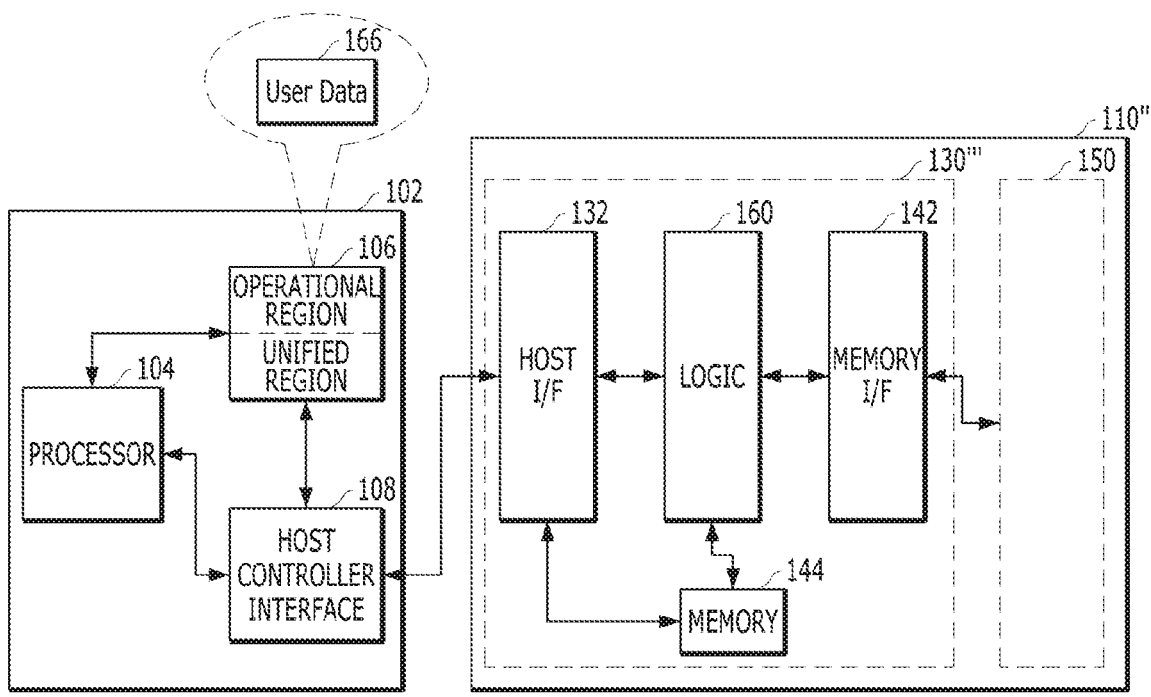
Figure 10:
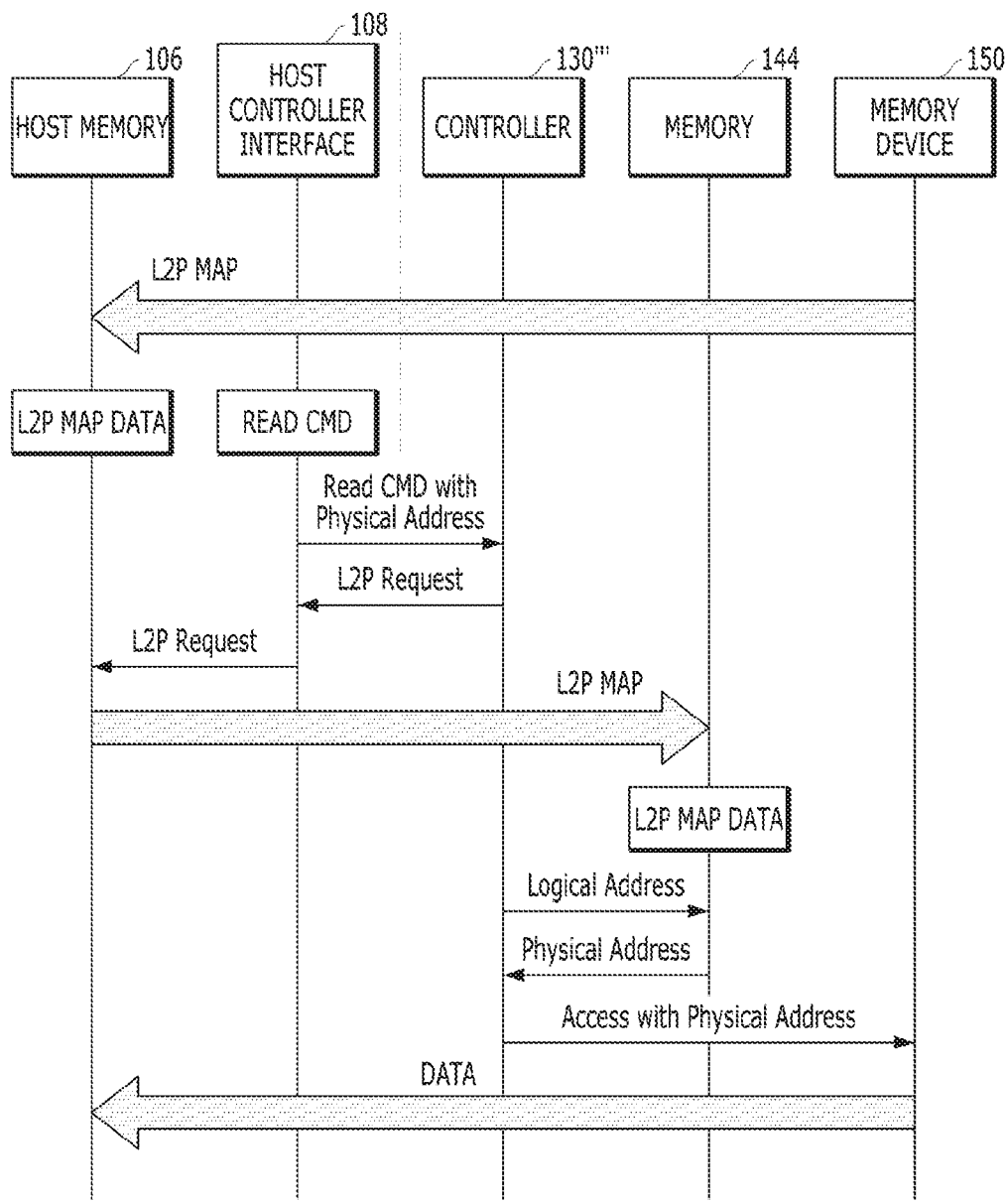
Figure 11:
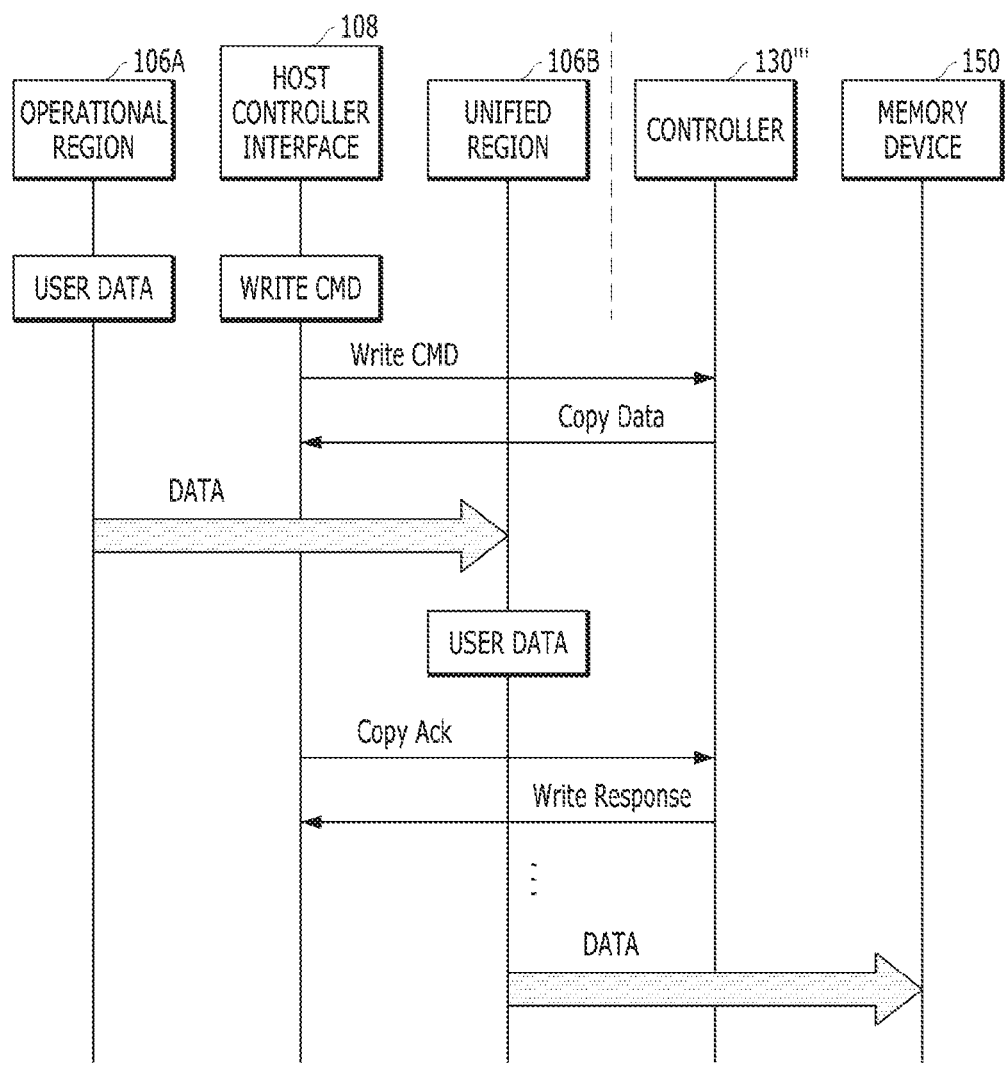

FIGS. 6 to 11 illustrate examples of increasing the operating efficiency of a memory system. Specifically, FIGS. 6 to 8 illustrate a case where a part of a memory included in a host can be used as a cache device for storing metadata used in the memory system. FIGS. 9 to 11 illustrate a case where a part of the memory included in the host can be used as a buffer for temporarily storing any one of metadata or user data which should be eventually stored in the memory system.

Referring to FIG. 6, the host 102 may include a processor 104, a memory 106, and a host controller interface 108. A memory system 110' may include a controller 130" and a memory device 150. Herein, the controller 130" and the memory device 150 described in FIG. 6 may corresponds to the controller 130, 130' and the memory device 150 described in FIGS. 1 to 5.

Hereinafter, a difference between the controller 130" and the memory device 150 shown in FIG. 6 and the controller 130, 130' and the memory device 150 shown in FIGS. 1 to 5, which can technically be distinguished, is mainly described. Particularly, a logic block 160 in the controller 130" may correspond to the flash translation layer (FTL) 40 described in FIG. 3. However, according to an embodiment, the logic block 160 in the controller 130" may work as an additional role and perform an additional function not described in the flash translation layer (FTL) 40 shown in FIG. 3.

The host 102 may include the processor 104, which has a higher performance than that of the memory system 110', and the memory 106 which is capable of storing a larger amount of data than that of the memory system 110' that cooperates with the host 102. The processor 104 and the memory 106 in the host 102 can have an advantage in views of space and upgrade. For example, the processor 104 and the memory 106 can have less space limitation than the processor 134 and the memory 144 in the memory system 110'. The processor 104 and the memory 106 can be replaceable for upgrading their performance, which is distinguishable from the processor 134 and the memory 144 in the memory system 110'. In the embodiment, the memory system 110' can utilize the resources possessed by the host 102 in order to increase the operation efficiency of the memory system 110'.

As an amount of data which can be stored in the memory system 110' increases, an amount of metadata corresponding to the data stored in the memory system 110' also increases. When storage capability used to load the metadata in the memory 144 of the controller 130" is limited or restricted, the increase in an amount of loaded metadata may cause an operational burden on operations of the controller 130". For example, because of limitation of space or region allocated for metadata in the memory 144 of the controller 130", a part, but not all, of the metadata may be loaded. If loaded metadata does not include a specific metadata for a physical location to which the host 102 is intended to access, the controller 130" must store the loaded metadata back into the memory device 150 if some of the loaded metadata has been updated, as well as load the specific metadata for the physical location to which the host 102 is intended to access. These operations should be performed for the controller 130" to perform a read operation or a write operation required by the host 102, and may degrade performance of the memory system 110.

Storage capability of the memory 106 included in the host 102 may be larger by tens or hundreds of times (orders of magnitude) over that of the memory 144 included in the controller 130". The memory system 110' may transfer a metadata 166 used by the controller 130" to the memory 106 in the host 102 so that at least some part of the memory 106 in the host 102 may be accessed by the memory system 110'. The at least some part of the memory 106 can be used as a cache memory for address translation required for reading or writing data in the memory system 110'. In this case, the host 102 translates a logical address into a physical address based on the metadata 166 stored in the memory 106 before transmitting the logical address along with a request, a command or an instruction to the memory system 110'. Then, the host 102 can transmit the translated physical address with the request, the command or the instruction to the memory system 110'. The memory system 110', which receives the translated physical address with the request, the command or the instruction, may skip an internal process of translating the logical address into the physical address and access the memory device 150 based on the physical address transferred. In this case, an overhead (e.g., operational burden) that the controller 130" loads metadata from the memory device 150 for the address translation may be gone, and operational efficiency of the memory system 110 can be enhanced.

On the other hand, even if the memory system 110' transmits the metadata 166 to the host 102, the memory system 110' can control mapping information based on the metadata 166 such as metadata generation, erase, update and the like. The controller 130" in the memory system 110' may perform a background operation such as garbage collection and wear leveling according to an operation state of the memory device 150 and may determine a physical address, i.e., which physical location in the memory device 150 data transferred from the host 102 is stored. Because a physical address of data stored in the memory device 150 may be changed and the host 102 does not know the changed physical address, the memory system 110' may control the metadata 166 initiatively.

While the memory system 110' controls metadata used for the address translation, it can be determined that the memory system 110' needs to modify or update the metadata 166 previously transmitted to the host 102. The memory system 110' can send a signal or a metadata to the host 102 so as to request the update of the metadata 166 stored in the host 102. The host 102 may update the stored metadata 166 in the memory 106 in response to a request delivered from the memory system 110'. This allows the metadata 166 stored in the memory 106 in the host 102 to be kept as the latest version such that, even though the host controller interface 108 uses the metadata 166 stored in the memory 106, there is no problem in an operation that a logical address is translated into a physical address and the translated physical address is transmitted along with the logical address to the memory system 110'.

Meanwhile, the metadata 166 stored in the memory 106 may include mapping information used for translating a logical address into a physical address. Referring to FIG. 4, metadata associating a logical address with a physical address may include two distinguishable items: a first mapping information item used for translating a logical address into a physical address; and a second mapping information item used for translating a physical address into a logical address. Among them, the metadata 166 stored in the memory 106 may include the first mapping information. The second mapping information can be primarily used for internal operations of the memory system 110', but might not be used for operations requested by the host 102 to store data in the memory system 110' or read data corresponding to a particular logical address from the memory system 110'. Depending on an embodiment, the second mapping information item might not be transmitted by the memory system 110' to the host 102.

Meanwhile, the controller 130" in the memory system 110' can control (e.g., create, delete, update, etc.) the first mapping information item or the second mapping information item, and store either the first mapping information item or the second mapping information item to the memory device 150. Because the memory 106 in the host 102 is a kind of volatile memory, the metadata 166 stored in the memory 106 may disappear when an event such as interruption of power supply to the host 102 and the memory system 110 occurs. Accordingly, the controller 130" in the memory system 110' can not only keep the latest state of the metadata 166 stored in the memory 106 of the host 102, but also store the latest state of the first mapping information item or the second mapping information item in the memory device 150.

Referring to FIGS. 6 and 7, an operation requested by the host 102 to read data stored in the memory system 110' is described when the metadata 166 is stored in the memory 106 of the host 102.

Power is supplied to the host 102 and the memory system 110', and then the host 102 and the memory system 110' can be engaged with each other. When the host 102 and the memory system 110' cooperate, the metadata (L2P MAP) stored in the memory device 150 can be transferred to the host memory 106.

When a read command (Read CMD) is issued by the processor 104 in the host 102, the read command is transmitted to the host controller interface 108. After receiving the read command, the host controller interface 108 searches for a physical address corresponding to a logical address corresponding to the read command in the metadata (L2P MAP) stored in the host memory 106. Based on the metadata (L2P MAP) stored in the host memory 106, the host controller interface 108 can recognize the physical address corresponding to the logical address. The host controller interface 108 carries out an address translation for the logical address associated with the read command.

The host controller interface 108 transfers the read command (Read CMD) with the logical address as well as the physical address into the controller 130" of the memory system 110'. The controller 130" can access the memory device 150 based on the physical address entered with the read command. Data stored at a location corresponding to the physical address in the memory device 150 can be transferred to the host memory 106 in response to the read command (Read CMD).

An operation of reading data stored in the memory device 150 including a nonvolatile memory may take more time than an operation of reading data stored in the host memory 106 or the like which is a volatile memory. In the above-described operation for handing the read command (Read CMD), the controller 130" may skip or omit an address translation corresponding to the logical address entered from the host 102 (e.g., searching for and recognizing a physical address associated with the logical address). Specifically, in the address translation, the controller 130" might not have to load metadata from the memory device 150 or replace the metadata stored in the memory 144 when the controller 130" cannot find metadata for the address translation in the memory 144. This allows the memory system 110' to perform a read operation requested by the host 102 more quickly.

How to update the metadata (L2P MAP) previously stored in the host memory 106 is described with reference to FIGS. 6 to 8.

The memory system 110' electrically coupled with the host 102 can perform a read operation, a write operation, and a delete operation requested by the host 102. After the memory system 110' performs a read operation, a write operation, or a delete operation requested by host 102, the memory system 110' can update the metadata when a physical location of the data stored in the memory device 150 is changed. Further, in the course of performing a background operation (e.g., garbage collection or wear leveling) which is not requested by the host 102, the memory system 110 can update the metadata in response to a change in the physical location of data stored in the memory device 150. The controller 130" in the memory system 110' can detect whether metadata is updated through the above-described operation. That is, the controller 130 can check whether there is a dirty map which is caused through generation, update or delete of the metadata.

When the metadata becomes dirty, the controller 130" notifies the host controller interface 108 of the need to update the metadata previously stored in the host memory 106. The host controller interface 108 may request the controller 130" for metadata that needs to be updated (REQUEST MAP INFO. shown in FIG. 8). The controller 130" may send the metadata that needs to be updated in response to a request entered from the host controller interface 108 (SEND MAP INFO. shown in FIG. 8). Then, the host controller interface 108 delivers the transferred metadata into the host memory 106 and updates the previously stored metadata (L2P MAP UPDATE shown in FIG. 8) in the host memory 106.

Referring to FIG. 9, the controller 130m and the memory device 150 in the memory system 110" cooperating with the host 102 can individually correspond to the controller 130" and the memory device 150 in the memory system 110' described in FIG. 6. However, according to an embodiment, internal configuration, operation, or role of the controller 130'" in the memory system 110" shown in FIG. 9 can be technically or structurally distinguishable from the controller 130" described in FIG. 6.

Host 102 may also include a processor 104, a memory 106, and a host controller interface 108. The host 102 described in FIG. 9 may have a configuration similar to that of the host 102 described in FIG. 6. The host memory 106 included in the host 102 may include a host memory buffer. In addition, the host controller interface 108 may include a host bridge in configuration, operation, or role. Depending on an embodiment, the host controller interface 108 may include a memory controller or a memory interface for controlling the host memory 106.

In FIG. 6, the memory system 110' can use the host memory 106 included in the host 102 as a cache memory for temporarily storing the metadata 166, but the memory system 110" described in FIG. 9 may use the host memory 106 included in the host 102 as a buffer for storing user data 168. In FIG. 9, a case when the host memory 106 included in the host 102 stores the user data 168 is described. However, it is also possible for the controller 130m to store metadata as well as the user data 168 in the host memory 106.

Referring to FIG. 9, the host memory 106 included in the host 102 can be divided into an operational region and a unified region. Here, the operational region of the host memory 106 may be a space used by the host 102 to store data or signals in the course of performing an operation through the processor 104. On the other hand, the unified region of the host memory 106 may be a space used to support an operation of the memory system 110", rather than that of the host 102. The host memory 106 included in the host 102 may be used for another purpose depending on an operation time, and sizes of the operational region and the unified region may be dynamically determined. Because of these features, the host memory 106 included in the host 102 may be referred to as a provisional memory or storage.

The unified region can be provided by the host 102 allocating a portion of the host memory 106 for the memory system 110". The host 102 might not use the unified region for an operation internally performed in the host 102 regardless the memory system 110". In the memory system 110", a memory device 150 may include a nonvolatile memory that spends more time to read, write, or erase data than that of the host memory 106 in the host 102, which is a volatile memory. When a time spent or required to read, write or erase data in response to a request entered from the host 102 becomes long, a latency may occur in the memory system 110 to continuously execute plural read and write commands inputted from the host 102. Thus, in order to improve or enhance operational efficiency of the memory system 110", the unified region in the host 102 can be utilized as a temporary storage of the memory system 110".

By the way of example but not limitation, when the host 102 is tasked with writing a large amount of data to the memory system 110", it may take a long time for the memory system 110" to program the large amount of data to the memory device 150. When the host 102 tries to write or read other data to or from the memory system 110", a writing or reading operation relevant to the other data in the memory system 110" may be delayed because of the previous operation, i.e., it takes a long time for the memory system 110" to program the large amount of data into the memory device 150. In this case, the memory system 110" may request the host 102 to copy the large amount of data to the unified region of the host memory 106 without programming the large amount of data into the memory device 150. Because a time required to copy data from the operational region to the unified region in the host 102 is much shorter than a time required for the memory system 110" to program the data to the memory device 150, the memory system 110" can avoid delaying the writing or reading operation relevant to the other data. Thereafter, the memory system 110" can transfer the data temporarily stored in the unified region of the host memory 106 into the memory device 150, while the memory system 110" does not receive a command to read, write, or delete data, which is entered from the host 102. In this way, a user might not be aware of a problem that the operation may be slowed due to the memory system 110" including the nonvolatile memory device, and can believe that the host 102 and the memory system 110" handle or process user's requests at a high speed.

The controller 130''' in the memory system 110" can use an allocated portion of the host memory 106 (e.g., the unified region) in the host 102. The host 102 might not involve an operation performed by the memory system 110". The host 102 may transmit an instruction such as a read, a write, a delete, etc. with a logical address into the memory system 110". The controller 130''' in the memory system 110" may translate the logical address into a physical address. The controller 130''' may store metadata in the unified region of the host memory 106 in the host 102 when storage capacity of the memory 144 in the controller 130m is too small to load the metadata used for translating a logical address into a physical address. In an embodiment, using the metadata stored in the unified region of the host memory 106, the controller 130m may perform address translation (e.g., recognize a physical address corresponding to a logical address transferred from the host 102).

For example, the operation speed of the host memory 106 and the communication speed between the host 102 and the controller 130''' may be faster than the speed at which the controller 130''' accesses the memory device 150 and reads data stored in the memory device 150. Thus, rather than loading metadata stored from the memory device 150 as needed, the controller 130''' can quickly load the metadata from the host memory 106, as needed.

Referring to FIGS. 9 and 10, a read operation requested by the host 102 is described when metadata (L2P MAP shown in FIG. 10) is stored in the host memory 106 in the host 102.

After power is supplied into the host 102 and the memory system 110", the host 102 and the memory system 110" can be engaged with each other. When the host 102 and the memory system 110" cooperate, the metadata (L2P MAP) stored in the memory device 150 can be transferred into the host memory 106. Storage capacity of the host memory 106 may be larger than that of the memory 144 used by the controller 130''' in the memory system 110". Therefore, even if some or all of the metadata (L2P MAP) stored in the memory device 150 is entirely or mostly transferred into the host memory 106, it might not be burdened on operations of the host 102 and the memory system 110". At this time, the metadata (L2P MAP) transmitted into the host memory 106 may be stored in the unified region described in FIG. 9.

When a read command (READ CMD) is issued by the processor 104 in the host 102, the read command can be transmitted to the host controller interface 108. The host controller interface 108 may receive a read command and then transmit the read command with a logical address into the controller 130''' of the memory system 110".

When the memory 144 does not include metadata relevant to the logical address entered from the host 102, the controller 130''' in the memory system 110" may request the host controller interface 108 for the metadata corresponding to the logical address (L2P Request). The host controller interface 108 may transmit a corresponding portion of the metadata (L2P MAP) stored in the host memory 106 into the memory system 110" in response to the request of the controller 130'''.

As storage capacity of the memory device 150 increases, a range of logical addresses can become widened. For example, the value of the logical address (e.g., LBN1 to LBN2*$10^9$) may correspond to the storage capacity of the memory device 150. The host memory 106 may store metadata corresponding to most or all of the logical addresses, but the memory 144 included in the memory system 110" might not have a sufficient space to store the metadata. When the controller 130'" may determine that a logical address entered from the host 102 with the read command may belong to a particular range (e.g., LBN120 to LBN600), the controller 130'" can request the host controller interface 108 to send one or more metadata corresponding to the particular range (e.g., LBN120 to LBN600) or a larger range (e.g., LBN100 to LBN800). The host controller interface 108 may transmit the metadata requested by the controller 130'" into the memory system 110", and the transmitted metadata (L2P MAP) may be stored in the memory 144 of the memory system 110".

The controller 130'" may translate a logical address transmitted from the host 102 into a physical address based on the metadata (L2P MAP) stored in the memory 144. The controller 130'" may use the physical address to access the memory device 150, and data requested by the host 102 may be transferred from the memory device 150 to the host memory 106. At this time, the data transferred from the memory device 150 in response to the read command (READ CMD) may be stored in the operational region of the host memory 106.

As described above, the host memory 106 is used as a buffer for storing metadata (L2P MAP) so that the controller might not instantly read or store the metadata (L2P MAP) from the memory device 150. Accordingly, operational efficiency of the memory system 110" can be improved or enhanced.

Referring to FIGS. 9 and 11, an example in which the memory system 110" uses the host memory 106 in the host 102 as a data buffer in response to a write command of the host 102 is described. In FIG. 11, the host memory 106 in the host 102 can be divided into an operational region 106A and a unified region 106B.

When a write command (WRITE CMD) is issued by the processor 104 in the host 102, the write command is passed to the host controller interface 108. Here, the write command can is accompanied by data (USER DATA). An amount of data to be transferred with the write command may have a size corresponding to one page or less, a size corresponding to a plurality of pages, a plurality of blocks or more. Here, it can be assumed that the data accompanying the write command have a very large volume or size.

The host controller interface 108 notifies the controller 130'" in the memory system 110" of the write command (Write CMD). At this time, the controller 130'" may request the host controller interface 108 to copy data corresponding to the write command (Copy Data) to the unified region 106B. That is, the controller 130'" can use the unified region 106B as a write buffer, instead of receiving the data along with the write command and storing the data in the memory device 150.

According to a request entered from the controller 130'", the host controller interface 108 can copy the data corresponding to the write command (Write CMD) stored in the operational region 106A to the unified region 106B. Thereafter, the host controller interface 108 may notify the controller 130'" that the copy operation is completed (Copy Ack) in response to the request delivered from the controller 130'". After recognizing that the data corresponding to the write command (Write CMD) has been copied by the host controller interface 108 from the operational region 106A to the unified region 106B, the controller 130'" can inform completion of a write operation corresponding to the write command (Write CMD) to the host controller interface 108 (Write Response).

When the operation for a write command (Write CMD) involving a large volume of data (e.g., voluminous data) is completed through the above-described process, the memory system 110" can be ready to perform another operation corresponding to the next command entered from the host 102.

On the other hand, the data corresponding to a write command (Write CMD) temporarily stored in the unified region 106B may be transferred and stored into the memory device 150 by the memory system 110" when there is no command entered from the host 102.

As above described, the plural embodiments described in FIGS. 6 to 8 and FIGS. 9 to 11 can improve or enhance operational efficiency of the memory system 110', 110". The memory system 110', 110" uses a part of the host memory 106 included in the host 102 as a cache or a buffer and stores metadata or user data in the part of the host memory 106. It is possible to overcome limitation or restriction of storage space in the memory 144 used by the controller 130.

Figure 12:
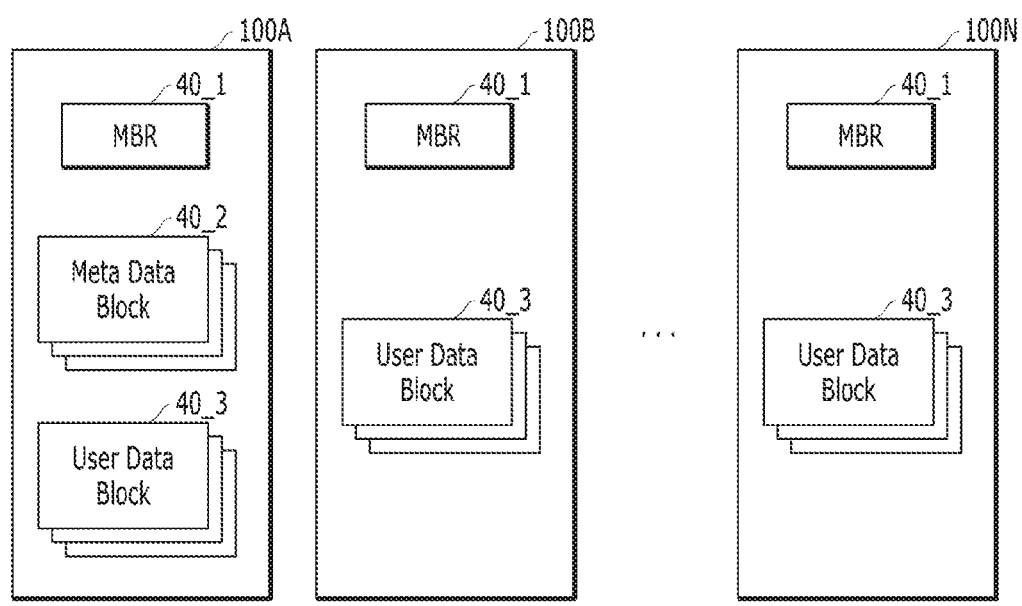
FIG. 12 shows configuration of the plurality of memory systems in the data processing system.

FIG. 12 illustrates a configuration directed to a plurality of memory systems 100A, 100B, ..., 100N which are engaged with a single host 102 (see FIGS. 1 to 3 and 6 to 11). The plurality of memory systems 100A, 100B, ..., 100N can be applicable to the data processing system 100 (see FIG. 1).

Referring to FIG. 12, the plurality of memory systems 100A, 100B, ..., 100N may include a first memory system 100A having a higher priority than the other memory systems 1006, ..., 100N. The number of the plurality of memory systems 100A, 100B, ..., 100N may be determined according to configuration of the data processing system 100.

Each of the plurality of memory systems 100A, 100B, ..., 100N may include configuration or components supporting for an operation independently requested by the host 102. For example, even if the second memory system 100B is electrically coupled with another host after disconnected from the host 102 that is currently connected, the second memory system 100B may perform an operation requested by another host. Each of the plurality of memory systems 100A, 100B, ..., 100N may independently include a specific area (e.g., Master Boot Record (MBR) 40_1) which is capable of storing information used for connection or engagement with other devices.

In an embodiment, when the plurality of memory systems 100A, 100B, ..., 100N cooperate with the host 102, a first memory system 100A having a higher priority than the other memory systems 100B, ..., 100N may include a metadata block 40_2 allocated for storing metadata regarding the plurality of memory systems 100A, 100B, ..., 100N coupled with the host 102. The host 102 uses the metadata of stored in the first memory system 100A having the highest priority to determine which of the plurality of memory systems 100A, 100B, ..., 100N is selected to store, delete, or read data.

In an embodiment, unlike the first memory system 100A that stores metadata, the other memory systems 100B, ..., 100N can include a user data block 40_3 that stores user data, not metadata. Because the metadata for the other memory systems 100B, ..., 100N is stored in the first memory system 100A, the other memory systems 100B, . . . , 100N can allocate a more space for storing user data.

Meanwhile, the first memory system 100A may include a metadata block 40_2 storing metadata as well as a user data block 40_3. As a size of metadata used for the plurality of memory systems 100A, 100B, . . . , 100N increases, the number of metadata blocks 40_2 arranged in the first memory system 100A may increase, but the number of user data blocks 40_3 in the first memory system 100A may decrease.

The first memory system 100A having the highest priority can allocate an address to the plurality of memory systems 100A, 100B, . . . , 100N, invalidate the allocated address, or reassign the invalidated address. For example, when a memory system is coupled with, and recognized by, the host 102, the first memory system 100A may assign a logical identifier to the recognized memory system. The first memory system 100A may determine a logical identifier for the recognized memory system and may reserve corresponding space in the metadata block 40_2 of the first memory system 100A to store metadata for the recognized memory system. Also, the first memory system 100A may notify the host 102 of the logical identifier used for the recognized memory system.

On the other hand, when the first memory system 100A having the highest high priority generates a problem or is predicted to be in trouble, the highest priority and given role assigned to the first memory system 100A are migrated to one of the other memory systems 100B, . . . , 100N, which are different from those previously given to the other memory systems 100B, . . . , 100N. According to an embodiment, when the first memory system 100A is detachable and is going to be disconnected from the host, the first memory system 100A is capable of migrating privileges, roles and data to one of the other memory systems 100B, . . . , 100N, which can work as the highest priority device between the other memory systems 100B, . . . , 100N.

Depending on the embodiment, when the first memory system 110A works as the highest priority device, at least one of the other memory systems 100B, . . . , 100N having a lower priority than the first memory system 110A may be disconnected from the host. At least one of the other memory systems 100B, . . . , 100N that are engaged with the host 102 can be communicated with another host. Therefore, before engagement with the host 102 is broken, metadata relevant to the corresponding memory system can be delivered from the first memory system 110A into the corresponding to memory system. In this process, the host 102 may notice information about at least one of the other memory systems 100B, . . . , 100N, which is going to be disconnected, to the first memory system 110A. The first memory system 110A may deliver corresponding metadata to the at least one of the other memory systems 100B, . . . , 100N in response to the information received from the host.

According to an embodiment, when the first memory system 110A may be connected to the host 102, at least one of the other memory systems 100B, . . . , 100N engaged with the host 102 may be electrically disconnected. Even though the at least one of the other memory systems 100B, . . . , 100N is separated, the first memory system 110A might not delete the metadata associated with the at least one of the other memory systems 100B, . . . , 100N. This is because the at least one of the other memory systems 100B, . . . , 100N which has been interrupted for a while can be re-engaged with the same host 102.

The first memory system 110A may reconfigure the metadata when a predetermined condition is met or satisfied. For example, when the at least one of the other memory systems 100B, . . . , 100N is no longer available or reconnected for more than a predetermined period or a set time, the first memory system 110A may determine that both maintaining the logical identifier assigned to the at least one of the other memory systems 100B, . . . , 100N and preserving a space allocated for metadata regarding at least one of the other memory systems 100B, . . . , 100N can lead to waste of resources. Accordingly, when the first memory system 110A check whether the predetermined condition is met or satisfied, the first memory system 110A can perform reconfiguration (e.g., garbage collection) regarding the metadata used for the plurality of memory systems 100A, 100B, . . . , 100N stored therein. According to an embodiment, the reconfiguration regarding the metadata used for the plurality of memory systems 100A, 100B, . . . , 100N may be performed every predetermined period (e.g., one day, one week, or one month).

Figure 13:
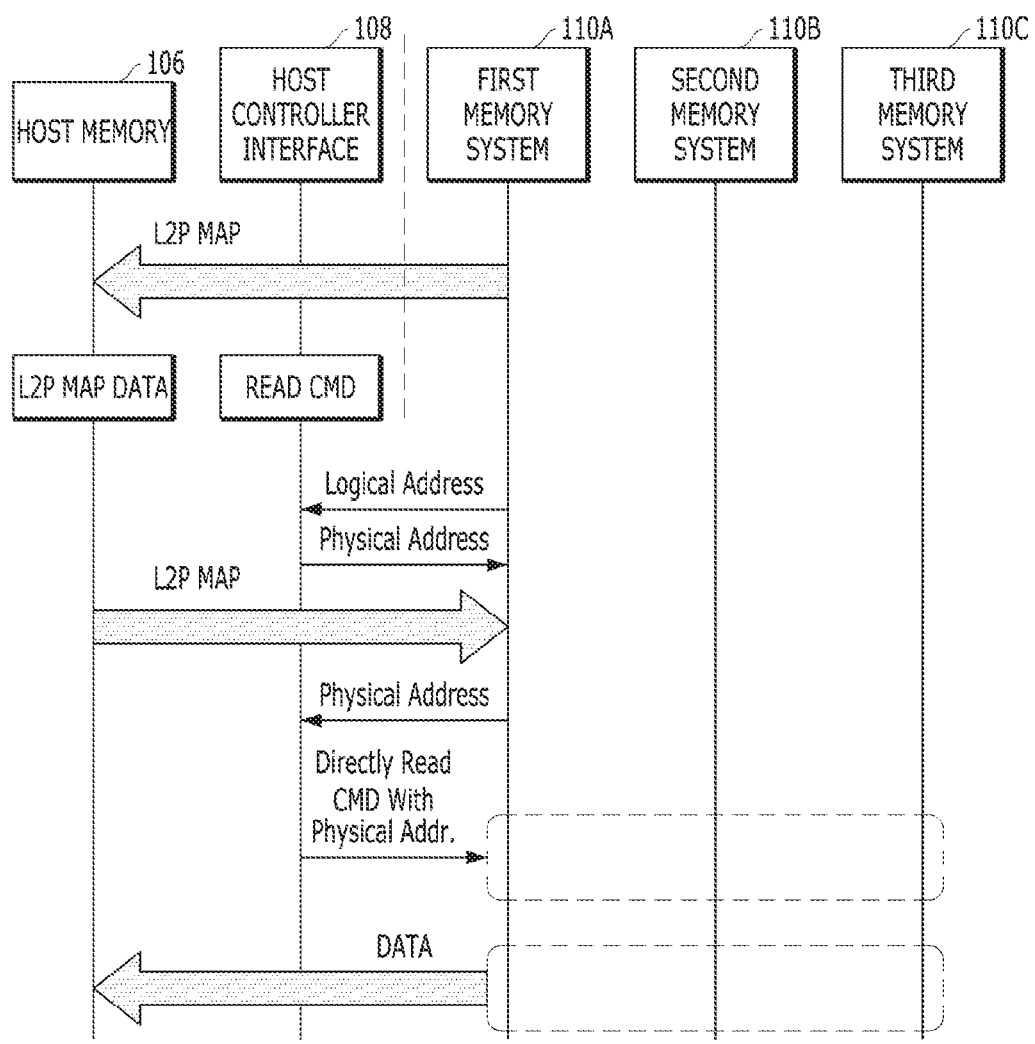
FIG. 13 illustrates an example of enhancing or increasing operational efficiency in a memory system and a data processing system.

FIG. 13 illustrates an example of improving operational efficiency in each of a plurality of memory systems.

Specifically, FIG. 13 illustrates an exemplary case in which a host memory 106 is used as a cache for enhancing the operational efficiency between a plurality of memory systems 110A, 110B, 110C and a single host when the plurality of memory systems 110A, 110B, 110C is operatively engaged with the single host.

Referring to FIG. 13, metadata (L2P MAP) stored in the first memory system 110A having the highest priority among the plurality of memory systems 110A, 110B, 110C may be transmitted to the host memory 106.

When a read command (READ CMD) is inputted to the host controller interface 108, the host controller interface 108 uses the metadata (L2P MAP) stored in the host memory 106 to translate a logical address corresponding to the read command into a physical address.

Based on the physical address, the host controller interface 108 may specify or recognize a specific physical location in the plurality of memory systems 110A, 110B, 110C, which would be tried to be accessed in response to the read command. That is, the host controller interface 108 can transfer the read command with the physical address to one of the plurality of memory systems 110A, 110B, 110C.

One of the plurality of memory systems 110A, 110B, 110C, which receives the physical address and the read command delivered from the host controller interface 108 can transfer data stored at the specific physical location to the host memory 106.

Through the above-described operations, the first memory system 110A having the highest priority among the plurality of memory systems 110A, 110B, 110C does not have to perform address translation so that internal operations for the address translation might not be performed within the first memory system 110A. Because the address translation and the internal operations performed by the first memory system 110A may be gone, it is possible to solve the problem that the overall operation between the plurality of memory systems 110A, 110B, 110C and the host can be delayed.

On the other hand, although not shown, metadata should be modified when a background operation (e.g., garbage collection or wear leveling) may be individually performed in each of the plurality of memory systems 110A, 110B, 110C. Each of the plurality of memory systems 110A, 110B, 110C can notify the first memory system 110A of which metadata should be updated as the latest version. After updating the metadata, the first memory system 110A may inform the host controller interface 108 about the updated metadata such that old metadata previously stored in the host memory 106 should be updated.

In another embodiment, which is not shown, a part of the host memory 106 may be used as a buffer for the plurality of memory systems 110A, 110B, 110C. In a case when the host controller interface 108 does not translate a logical address into a physical address, the first memory system 110A having the highest priority can translate the logical address into the physical address. When the first memory system 110A does not find metadata associated with the logical address, the first memory system 110A can request metadata associated with the logical address to the host controller interface 108 in order for translating the logical address into the physical address. The first memory system 110A can deliver the physical address into the host controller interface 108, and then the host controller interface 108 transmits a command with the physical address into one of the plurality of memory systems 110A, 110B, 110C, which corresponds to the physical address.

Further, the first memory system 110A may use the part of the host memory 106 to store data to be written in the plurality of memory systems 110A, 110B, 110C later.

Figure 14:
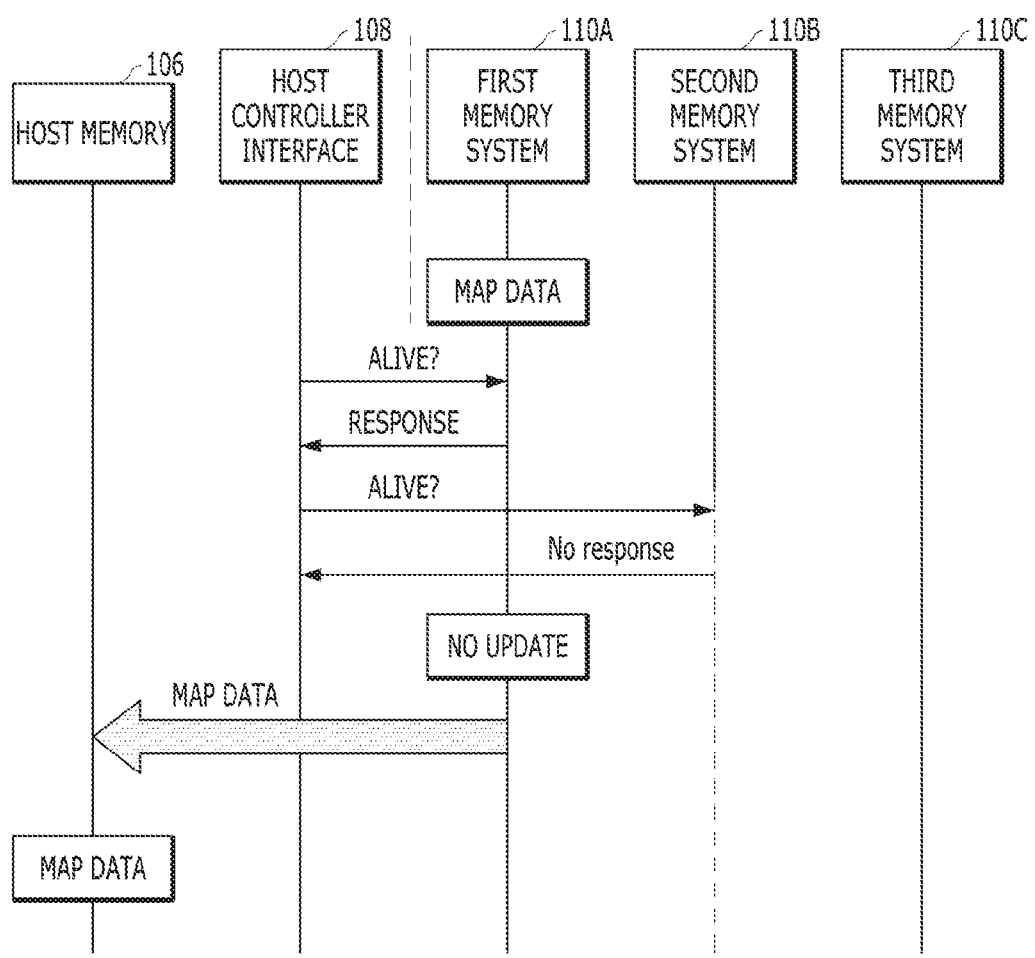
FIG. 14 shows an operation in a case when a memory system among the plurality of memory systems in the data processing system in accordance with an embodiment of the disclosure.

FIG. 14 shows an operation in a case when a memory system among the plurality of memory systems in the data processing system in accordance with an embodiment of the disclosure. In FIG. 14, at least one memory system among a plurality of memory systems 110A, 110B, 110C is not temporarily engaged with a host.

Referring to FIG. 14, the host controller interface 108 can determine whether it is possible to transmit/receive data to/from a plurality of memory systems 110A, 110B, 110C (e.g., data communication between the host and the plurality of memory systems 110A, 110B, 110C is available via a channel). For example, the host controller interface 108 may transmit a request signal (Alive) to each of the plurality of memory systems 110A, 110B, and 110C to confirm whether or not the connection is established.

In FIG. 14, the host controller interface 108 describes an example in which a request signal (Alive) is individually delivered into each of the plurality of memory systems 110A, 110B, 110C. According to an embodiment, the host controller interface 108 may broadcast at least one request signal (Alive) to the plurality of memory systems 110A, 110B, 110C.

A plurality of memory systems 110A, 110B, 110C receiving a request signal (Alive) entered from the host controller interface 108 can transmit a response signal (Response) against the request signal (Alive). In FIG. 14, it is assumed that the second memory system 110B has not transmitted a response signal (Response) against the request signal (Alive) transmitted from the host controller interface 108 (No response). Then, the host controller interface 108 can recognize or determine that the second memory system 110B cannot be accessible.

The host controller interface 108 might not notify this status of the second memory system 110B to the first memory system 110A when determining that the second memory system 110B is temporarily unresponsive. In another example, the host controller interface 108 may always notify it to the first memory system 110A that the second memory system 110B is not responding.

Regardless of whether the host controller interface 108 notifies it to the first memory system 110A that the second memory system 110B is temporarily unresponsive, the first memory system 110A might not update the metadata (L2P MAP) (NO UPDATE). The first memory system 110A may transmit metadata (L2P MAP) to the host memory 106 without any additional update even after the first memory system 110A receives the status of the second memory system 110B from the host controller interface 108. Accordingly, the metadata (L2P MAP) transmitted by the first memory system 110A may include pieces of metadata for the second memory system 110B that does not respond temporarily.

The reasons why a specific memory system is temporarily unresponsive can vary. Therefore, when the host controller interface 108 should update the metadata whenever determining that the second memory system 110B is temporarily unresponsive, the metadata may be updated unnecessarily and frequently. Accordingly, even if the host controller interface 108 determines that the second memory system 110B is temporarily unresponsive, it can be presumed that the second memory system 110B can be resumed soon and re-engaged with the host.

Figure 15:
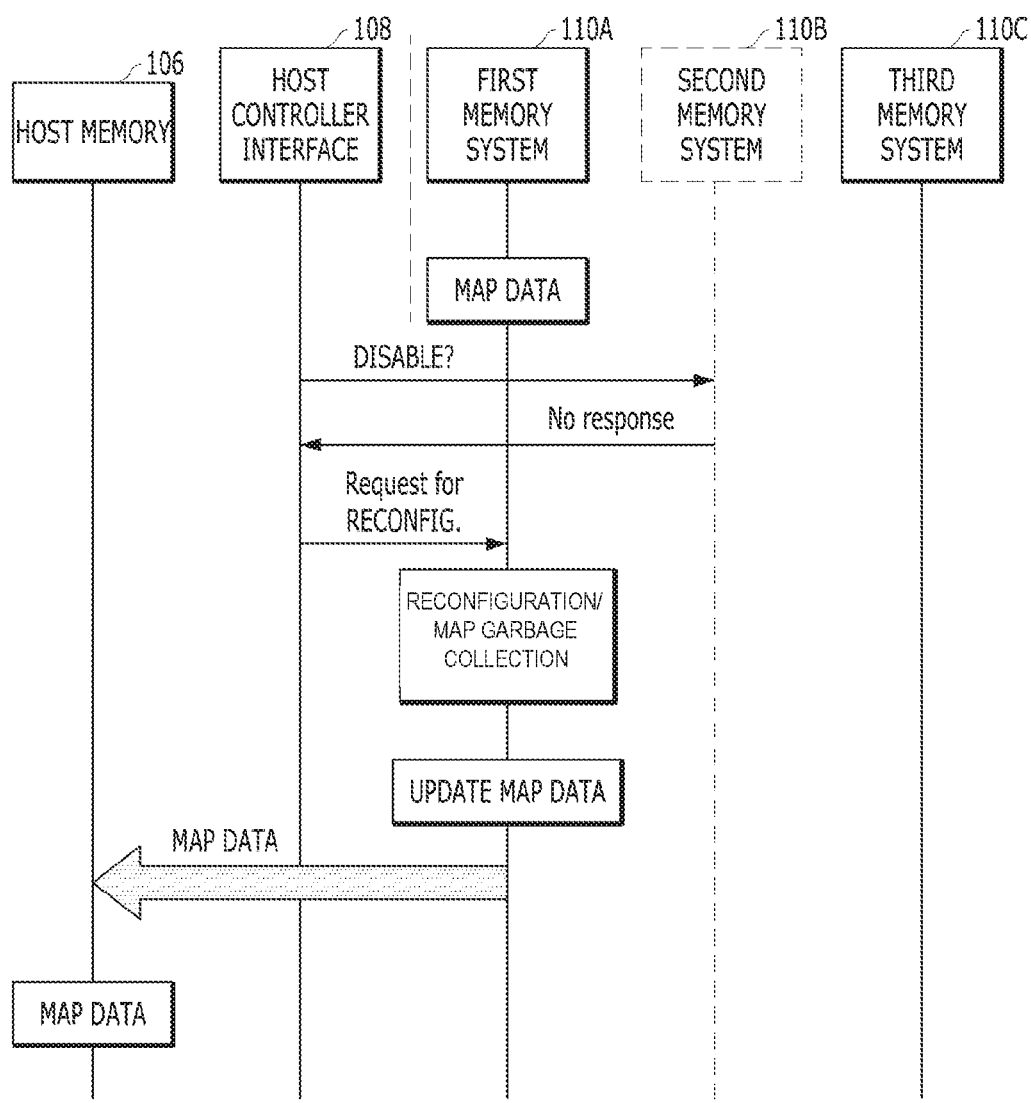
FIG. 15 describes a method for updating metadata of the plurality of memory systems.

FIG. 15 illustrates a method of updating metadata for a plurality of memory systems. Specifically, FIG. 15 illustrates a case where at least one of a plurality of memory systems 110A, 110B, 110C operatively engaged with a host becomes impossible to interwork with a host.

Referring to FIG. 15, the host controller interface 108 may transmit a disable check signal (Disable) into the plurality of memory systems 110A, 110B, 110C so as to recognize whether each of the plurality of memory systems 110A, 110B, 110C is disabled. The disable check signal (Disable) can be technically different and distinguishable from the request signal (Alive) described in FIG. 14. The request signal (Alive) is transmitted from the host system periodically or according to an event. But, the disable check signal (Disable) is a kind of subject signal appointed to a specific memory system among the plurality of memory systems 110A, 110B, 110C when the specific memory system may satisfy a preset condition. For example, for a memory system in which there is no response for a predetermined period against the request signal (Alive) transmitted from the host controller interface 108 or there is no response in response to a predetermined number of request signals (Alive), the host controller interface 108 may deliver a disable signal (Disable). In another example, when it is notified to the host controller interface 108 that a specific memory system among the plurality of memory systems 110A, 110B, 110C might not perform an operation normally, the host controller interface 108 can transmit a disable check signal to the specific memory system to monitor whether the specific memory system might not work.

In FIG. 15, it is assumed that the second memory system 110B is disabled, e.g., unable to perform data communication with the host controller interface 108. Herein, a status "disabled" can indicate that the second memory system 110B may be not operatively engaged with the host. When the host controller interface 108 recognizes that the second memory system 110B is disabled through the disable check signal, the host controller interface 108 requests the first memory system 110A to reconfigure the metadata (Request for Reconfig.). The first memory system 110A may invalidate both the logical identifiers and metadata which are assigned to the second memory system 110B, in response to the request of the host controller interface 108. The first memory system 110A may then update the metadata and deliver the updated metadata to the host memory 106.

In addition, the first memory system 110A may invalidate all data or information (e.g., a logical identifier) assigned to the second memory system 1106 and then assign the invalidated data to another memory system (e.g., a newly recognized memory system).

Although not shown, according to an embodiment, when the host controller interface 108 recognizes that the second memory system 1106 is disabled through the disable check signal (Disable), the host controller interface 108 may perform re-reconfiguration on the metadata. For example, the host controller interface 108 may invalidate all metadata assigned to the second memory system 1106. The host controller interface 108 may notify the first memory system 110A of the result after reconfiguration of the metadata. The first memory system 110A may update the metadata based on the reconfiguration result of the metadata, which is transmitted from the host controller interface 108. Later, the first memory system 110A may forward the updated metadata to the host memory 106.

Figure 16:
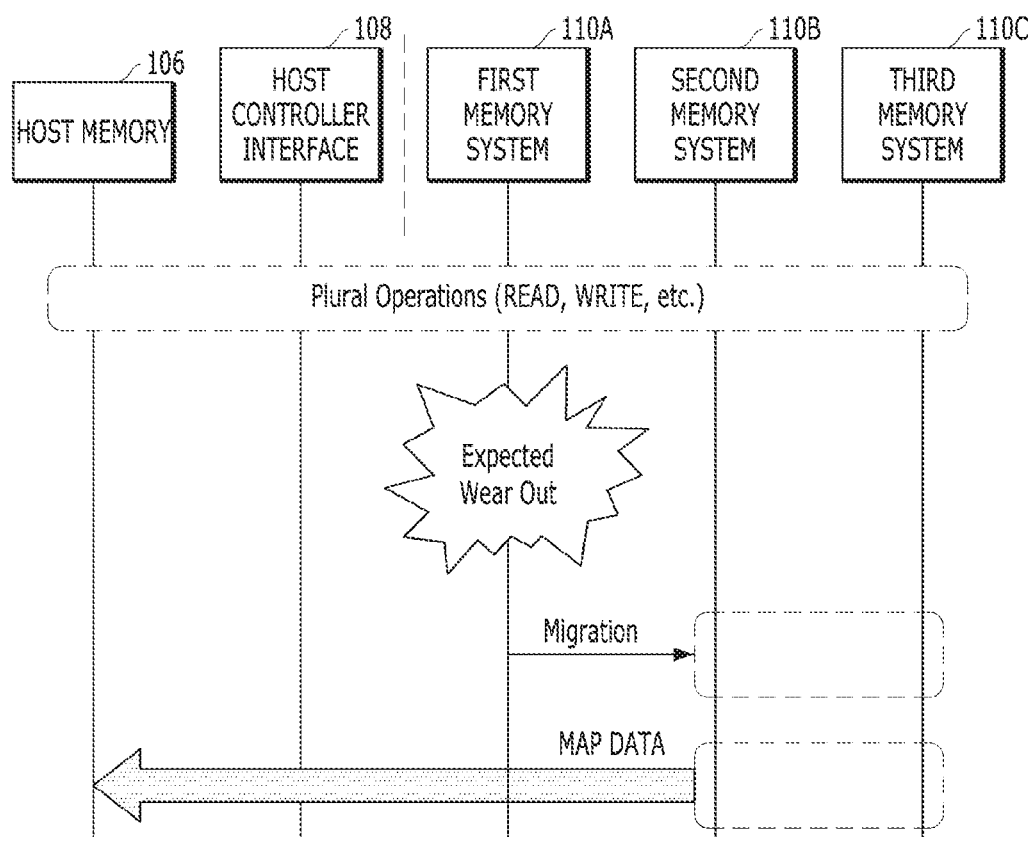
FIG. 16 illustrates a method of transferring authority between the plurality of memory systems.

FIG. 16 illustrates a method of migrating an authority or a role between a plurality of memory systems.

Referring to FIG. 16, a host operatively engaged with a plurality of memory systems 110A, 110B, 110C may perform a plurality of operations through a host controller interface 108. It is assumed that the first memory system 110A among the plurality of memory systems 110A, 110B, 110C has the highest priority than the other memory systems 110B, 110C.

The first memory system 110A may monitor its operating state. It can be determined that the first memory system 110A is in a state (e.g., an operation state such as a wear-out or a run-out) where it might be difficult to perform an operation normally or safely, through a self-diagnosis operation (Expected Wear Out). In this case, the first memory system 110A may migrate its privileges and roles to one of the other memory systems 110B, 110C. For example, the metadata stored in the first memory system 110A may be moved to one of the other memory systems 110B, 110C. Once the transfer from the first memory system 110A to one of the other memory systems 110B, 110C is complete, the memory system including the transferred metadata may transfer the metadata to the host memory 106 as a primary device.

Meanwhile, although not shown, when an emergency situation occurs in the first memory system 110A, it is possible that the first memory system 110A could not migrate its authority and role to one of the other memory systems 110B, 110C. Referring to FIG. 13, when metadata stored in the first memory system 110A cannot be copied or moved to another memory system, metadata stored in the host memory 106 can be utilized for migration.

Further, according to an embodiment, when different memory systems 110B, 110C have backup information regarding the metadata stored in the first memory system 110A, each of the other memory systems 110B, 110C can individually recover the metadata when the first memory system 110A suddenly does not work. In this case, each of the available memory systems 110B, 110C may try or restart an operation for interworking with the host controller interface 108 based on the recovered metadata. For example, which of the available memory systems 110B, 110C is given the highest priority may be determined by the host controller interface 108.

In a data processing system including a plurality of memory systems operatively engaged with at least one host, a different priority can be individually given to a plurality of memory systems, and a memory system having the highest priority can control or manage metadata for the plurality of memory system to improve or increase efficiency in interworking between the plurality of memory systems and the host.

Embodiments of the disclosure also relates to a method for controlling or managing a plurality of memory systems when a memory system having the highest priority might have a lower performance than a threshold or be expected to wear out. Even if a memory system having a bad operation state among a plurality of memory systems is removed, migrating its role, priority or authority to another memory system can provide an advantage that interworking can be continuously performed and not halted.

Embodiments of the disclosure can provide a data processing system including a plurality of memory systems, which dynamically allocates or moves information used for interlocking the plurality of memory systems according to operation states of each of the plurality of memory systems.

While the present teachings have been illustrated and described with respect to specific embodiments, it will be apparent to those skilled in the art in light of the present disclosure that various changes and modifications may be made without departing from the spirit and scope of the invention as defined in the following claims.

What is claimed is:

1. A data processing system, comprising:
a host configured to handle data in response to an input entered from an external device; and
a plurality of memory systems engaged with the host, wherein the plurality of memory systems are configured to store or output the data in response to a request generated by the host,
wherein a first memory system among the plurality of memory systems stores metadata for the plurality of memory systems,
wherein the first memory system receives the metadata stored in each other memory system of the plurality of memory systems,
wherein the metadata comprises first mapping information used for translating a logical address into a physical address,
wherein the first memory system transfers the metadata to the host when power is supplied to the host and the first memory system, and wherein, when the first memory system updates or modifies the metadata, the first memory system sends a request for transferring and updating the metadata to the host.

2. The data processing system according to claim 1, wherein a highest priority among priorities assigned to the plurality of memory systems is assigned to the first memory system, and
wherein the first memory system assigns a different logical identifier to each other memory system of the plurality of memory systems.

3. The data processing system according to claim 2, wherein, when an operational status of the first memory system meets a preset condition, the highest priority of the first memory system is migrated to one of the other memory systems.

4. The data processing system according to claim 2, wherein the first memory system is embedded in the host, and at least one of the other memory systems is detachable from the host.

5. The data processing system according to claim 4, wherein, even though at least one of the other memory systems is detached from the host, a logical identifier assigned to the at least one of the other memory systems and metadata stored in the first memory system are maintained.

6. The data processing system according to claim 1, wherein, when at least one memory system of the plurality of memory systems is unable to perform data communication with the host, a logical identifier assigned to the at least one memory system is withdrawn and re-assigned to another memory system.

7. The data processing system according to claim 1, wherein each of the plurality of memory systems includes second mapping information used for translating a physical address into a logical address.

8. The data processing system according to claim 1, wherein each of the plurality of memory systems performs garbage collection according to an autonomous decision, and wherein the first memory system performs garbage collection against the metadata when the host performs re-configuration on the metadata.

9. A memory system, comprising:

a memory device comprising a first region configured to store metadata and a second region configured to store user data; and a controller configured to store or delete the metadata and the user data in the memory device, wherein the controller is notified of authority by a host to use a part of a memory included in the host after being operatively engaged with the host, wherein, when a given priority of the memory system is a preset value, the controller determines a logical identifier for at least one other memory system, transmits the logical identifier to the host, and stores metadata for the at least one other memory system in the memory device, and wherein the controller requests the host to store at least one of the metadata or user data transferred from the host to the controller or the at least one other memory system in the part of the memory included in the host.

10. The memory system according to claim 9, wherein the metadata comprises first mapping information used for translating a logical address into a physical address, and wherein, when the given priority of the memory system is not the preset value, the first mapping information is not stored in the memory device but transferred into another memory system having a priority of the present value.

11. The memory system according to claim 10, wherein the memory device stores second mapping information used for translating a physical address into a logical address, regardless of the given priority of the memory system.

12. The memory system according to claim 11, wherein the controller uses the second mapping information to perform garbage collection without a command entered from the host.

13. A system, engaged with a host and a plurality of memory systems, comprising at least one processor and at least one memory including computer program code, wherein the at least one memory and the computer program code are configured, with the at least one processor, to cause the system to:

receive notification of authority to use a part of a host memory included in the host;

transmit metadata to the part of the host memory included in the host;

receive a read command and a first logical address which are entered from the host;

search for a first physical address, which corresponds to the first logical address entered with the read command from the host, in the at least one memory;

send a request for some of the metadata associated with the first logical address when the first physical address is not found;

receive the some of the metadata delivered in response to the request and store the some of the metadata in the at least one memory;

translate the first logical address into the first physical address based on the some of the metadata; and use the first physical address to access a memory device and output data stored at a physical location in the memory device, which is identified by the first physical address.

14. The system according to claim 13, wherein the at least one memory and the computer program code are configured, with the at least one processor, to further cause the system to:

receive a write command entered from the host;

request the host to store data corresponding to the write command in the part of the host memory when the data is larger than a preset threshold;

check that the data is copied in the part of the host memory, and notify the host that an operation corresponding to the write command is complete; and migrate the data copied in the part of the host memory to the memory device while no command is entered from the host.

15. The system according to claim 13, wherein the at least one memory and the computer program code are configured, with the at least one processor, to further cause the system to:

assign a logical identifier corresponding to each of the plurality of other memory systems.

16. The system according to claim 13, wherein the at least one memory and the computer program code are configured, with the at least one processor, to further cause the system to:

copy the metadata to one of the plurality of other memory systems when an operational status meets a preset condition.

17. The system according to claim 16, wherein the memory device comprises a first region storing the metadata and a second region storing user data.

18. The system according to claim 17, wherein the metadata includes first mapping information used for translating a logical address into a physical address regarding the user data and data stored in the plurality of other memory systems.

* * * * *